US012125493B2

(12) United States Patent
Enamito et al.

(10) Patent No.: US 12,125,493 B2
(45) Date of Patent: Oct. 22, 2024

(54) ONLINE CONVERSATION MANAGEMENT APPARATUS AND STORAGE MEDIUM STORING ONLINE CONVERSATION MANAGEMENT PROGRAM

(71) Applicant: KABUSHIKI KAISHA TOSHIBA, Tokyo (JP)

(72) Inventors: Akihiko Enamito, Kawasaki (JP); Osamu Nishimura, Kawasaki (JP); Takahiro Hiruma, Tokyo (JP); Rika Hosaka, Yokohama (JP); Tatsuhiko Goto, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 296 days.

(21) Appl. No.: 17/652,592

(22) Filed: Feb. 25, 2022

(65) Prior Publication Data

US 2023/0078804 A1 Mar. 16, 2023

(30) Foreign Application Priority Data

Sep. 16, 2021 (JP) ................................ 2021-151457

(51) Int. Cl.
*G10L 21/0208* (2013.01)
*G10L 25/84* (2013.01)
(Continued)

(52) U.S. Cl.
CPC .......... *G10L 21/0208* (2013.01); *G10L 25/84* (2013.01); *H04R 5/04* (2013.01);
(Continued)

(58) Field of Classification Search
CPC ................. G10L 21/0208; G10L 25/84; G10L 2021/02087; H04R 5/04; H04R 3/02;
(Continued)

(56) References Cited

U.S. PATENT DOCUMENTS 5,594,800 A * 1/1997 Gerzon ..................... H04S 3/02 381/20
5,757,927 A * 5/1998 Gerzon ..................... H04S 3/02 381/20
(Continued)

FOREIGN PATENT DOCUMENTS

JP 2006-74386 A 3/2006
JP 2008-160397 A 7/2008
(Continued)

OTHER PUBLICATIONS

Kashiyama, K. "Railway noise evaluation system using visualization and audibility by VR technology" Noise Control vol. 44, No. 4, 2020 (15 pages) with Machine Translation.
(Continued)

*Primary Examiner* — Abul K Azad
(74) *Attorney, Agent, or Firm* — Oblon, McClelland, Maier & Neustadt, L.L.P.

(57) ABSTRACT

An online conversation management apparatus includes a processor. The processor acquires, across a network, reproduction environment information from at least one terminal that reproduces a sound image via a reproduction device. The reproduction environment information is information of a sound reproduction environment of the reproduction device. The processor acquires azimuth information. The azimuth information is information of a localization direction of the sound image with respect to a user of the terminal. The processor performs control for reproducing a sound image of each terminal based on the reproduction environment information and the azimuth information.

19 Claims, 19 Drawing Sheets

(51) Int. Cl.
*H04R 5/04* (2006.01)
*H04S 7/00* (2006.01)

(52) U.S. Cl.
CPC .... *H04S 7/302* (2013.01); *G10L 2021/02087* (2013.01); *H04S 2420/01* (2013.01)

(58) Field of Classification Search
CPC ..... H04R 27/00; H04S 7/302; H04S 2420/01; H04S 7/305; H04S 2400/01; H04S 2400/11
See application file for complete search history.

(56) References Cited

U.S. PATENT DOCUMENTS

| | | | | |
|---|---|---|---|---|
| 5,812,674 | A * | 9/1998 | Jot | H04S 7/305 381/63 |
| 6,021,205 | A * | 2/2000 | Yamada | H04S 1/007 381/74 |
| 9,088,854 | B2 | 7/2015 | Enamito et al. | |
| 2006/0045276 | A1 | 3/2006 | Gamo | |
| 2009/0002477 | A1* | 1/2009 | Cutler | H04N 23/6812 348/14.1 |
| 2009/0238371 | A1* | 9/2009 | Rumsey | H04R 29/001 381/58 |
| 2009/0252356 | A1* | 10/2009 | Goodwin | H04S 1/002 381/310 |
| 2012/0250869 | A1 | 10/2012 | Ohashi | |
| 2013/0202116 | A1* | 8/2013 | Par | H04S 5/00 381/17 |
| 2013/0336490 | A1 | 12/2013 | Someda | |
| 2015/0086023 | A1 | 3/2015 | Enamito et al. | |
| 2015/0296086 | A1 | 10/2015 | Eckert et al. | |
| 2015/0350788 | A1 | 12/2015 | Someda et al. | |
| 2017/0092298 | A1* | 3/2017 | Nakamura | G10L 25/84 |

FOREIGN PATENT DOCUMENTS

| | | | |
|---|---|---|---|
| JP | 2012-212982 | A | 11/2012 |
| JP | 2013-51631 | A | 3/2013 |
| JP | 2014-17813 | A | 1/2014 |
| JP | 2015-65541 | A | 4/2015 |
| JP | 5944567 | B2 | 7/2016 |
| JP | 6255076 | B2 | 12/2017 |
| JP | 6407568 | B2 | 10/2018 |

OTHER PUBLICATIONS

Okumura, H. "Sonification of sound using 3D sound technology ViRealTM" Noise Control vol. 44, No. 4, 2020 (15 pages) with Machine Translation.

Kondo, K. "Examination of virtual audio conferencing client using enhanced acoustic reality" Engineering and Technical Research Survey on Telecommunications Technology 10-01027, Graduate School of Science and Engineering, Yamagata University, 2012 (31 pages) with Machine Translation.

* cited by examiner

ONLINE CONVERSATION MANAGEMENT APPARATUS AND STORAGE MEDIUM STORING ONLINE CONVERSATION MANAGEMENT PROGRAM

CROSS-REFERENCE TO RELATED APPLICATIONS

This application is based upon and claims the benefit of priority from the Japanese Patent Application No. 2021-151457, filed Sep. 16, 2021, the entire contents of which are incorporated herein by reference.

FIELD

Embodiments described herein relate generally to an online conversation management apparatus and a storage medium storing an online conversation management program.

BACKGROUND

A sound image localization technique is known in which a sound image is localized in a space around the head of a user by using various types of sound reproduction devices different in sound reproduction environment, such as two channels of loudspeakers arranged in front of the user, earphones attached to the ears of the user, and headphones attached to the head of the user. This sound image localization technique can provide the user with an illusion that the sound is heard from a direction different from the direction in which the reproduction device actually exists.

Recently, attempts are being made to use the sound image localization technique in online conversation. In the case of an online meeting, for example, it is sometimes difficult to distinguish between the voices of a plurality of speakers because the voices are concentrated. By contrast, when the sound images of individual speakers are localized in different directions of a space around the head of a user, the user can distinguish between the voices of the individual speakers.

To localize sound images in a space around the head of each user, information of the sound reproduction environment of a reproduction device of each user must be known. If the sound reproduction environments of voice reproduction devices of users are different, an inconvenience that sound images are appropriately localized for one user but are not appropriately localized for another user can occur.

An embodiment provides an online conversation management apparatus and a storage medium storing an online conversation management program, by which appropriately localized sound images are reproduced for each user even when the sound reproduction environments of voice reproduction devices of individual users are different in the case of online conversation.

DETAILED DESCRIPTION

In general, according to one embodiment, an online conversation management apparatus includes a processor. The processor acquires, across a network, reproduction environment information from at least one terminal that reproduces a sound image via a reproduction device. The reproduction environment information is information of a sound reproduction environment of the reproduction device. The processor acquires azimuth information. The azimuth information is information of a localization direction of the sound image with respect to a user of the terminal. The processor performs control for reproducing a sound image of each terminal based on the reproduction environment information and the azimuth information.

Embodiments will be explained below with reference to the accompanying drawings.

First Embodiment

Figure 1:
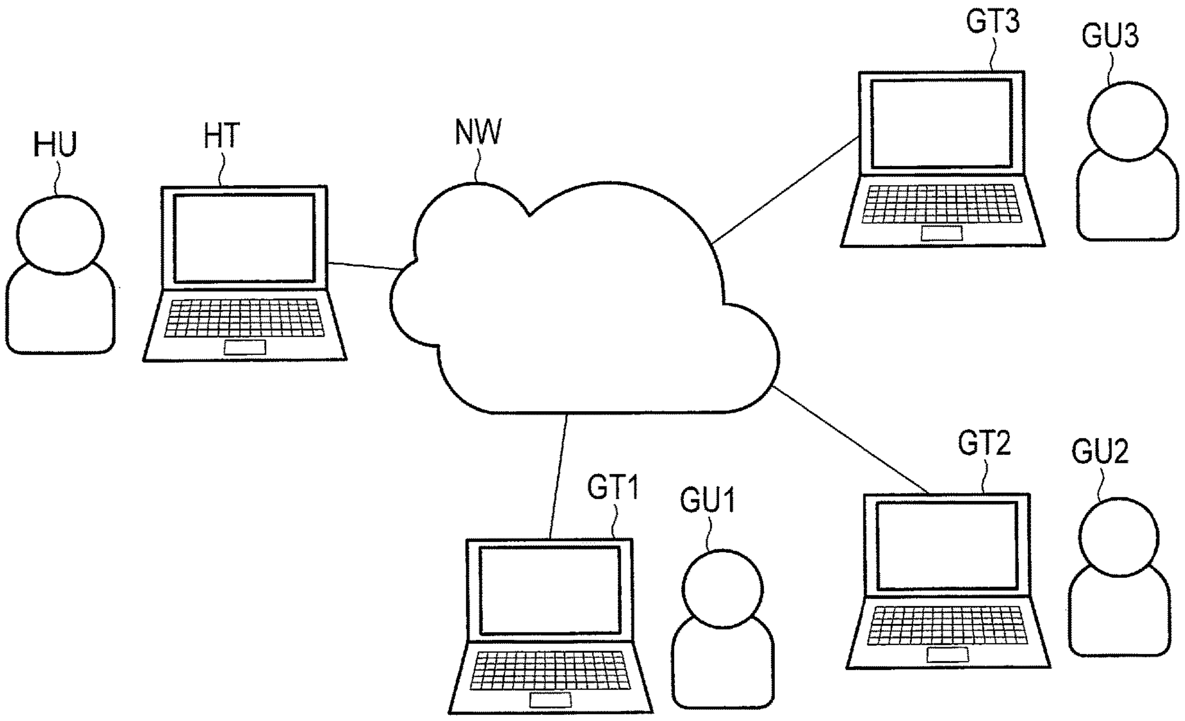
FIG. 1 is a view showing the configuration of an online conversation system including an online conversation management apparatus according to the first embodiment.

FIG. 1 is a view showing the configuration of an example of an online conversation system including an online conversation management apparatus according to the first embodiment. In this online conversation system shown in FIG. 1, a plurality of terminals, i.e., four terminals HT, GT1, GT2, and GT3 are communicably connected across a network NW, and users HU, GU1, GU2, and GU3 of the terminals HT, GT1, GT2, and GT3 perform conversation via these terminals. In the first embodiment, the terminal HT is a host terminal to be operated by the user HU as a host of the online conversation, and the terminals GT1, GT2, and GT3 to be operated by the users GU1, GU2, and GU3 participating as guests in this online conversation are guest terminals. In this conversation using the terminals HT, GT1, GT2, and GT3, the terminal HT collectively performs control for localizing sound images in a space around the head of each of the users HU, GU1, GU2, and GU3. Although the number of terminals is four in FIG. 1, the present embodiment is not limited to this. The number of terminals need only be two or more. When the number of terminals is two, these two terminals can be used in online conversation. Alternatively, when the number of terminals is two, one terminal can be used not to reproduce voices but to perform control for localizing sound images in a space around the head of the other user.

Figure 2:
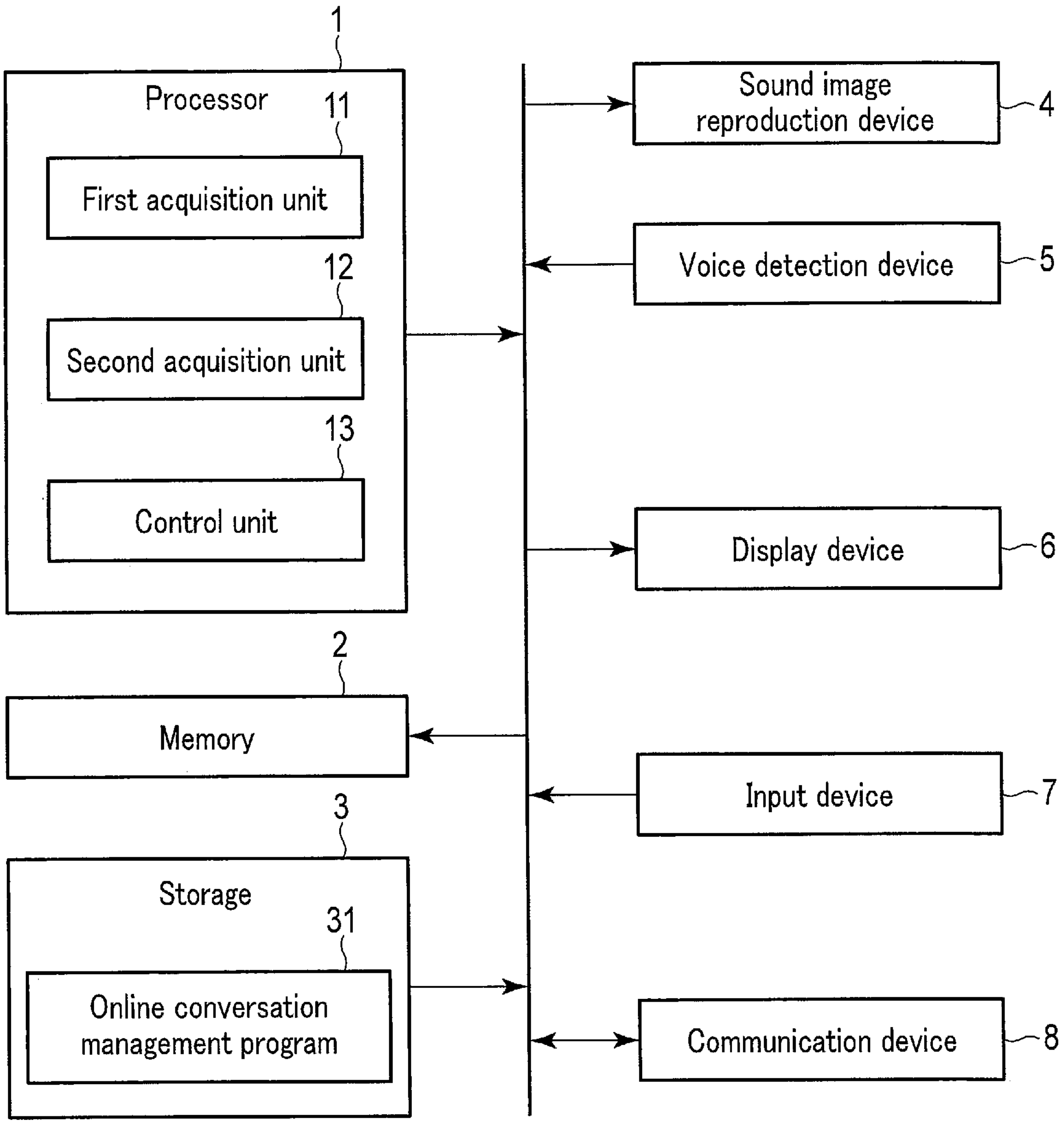
FIG. 2 is a view showing the configuration of an example of a terminal.

FIG. 2 is a view showing the configuration of an example of the terminals shown in FIG. 1. The explanation will be made by assuming that the terminals HT, GT1, GT2, and GT3 basically have the same elements. As shown in FIG. 2, the terminal includes a processor 1, a memory 2, a storage 3, a voice reproduction device 4, a voice detection device 5, a display device 6, an input device 7, and a communication device 8. Assume that the terminal is one of various kinds of communication terminals such as a personal computer (PC), a tablet terminal, and a smartphone. Note that each terminal does not always have the same elements as those shown in FIG. 2. Each terminal need not have some of the elements shown in FIG. 2, and can also have elements other than those shown in FIG. 2.

The processor 1 controls the overall operation of the terminal. For example, the processor 1 of the host terminal HT operates as a first acquisition unit 11, a second acquisition unit 12, and a control unit 13 by executing programs stored in the storage 3 or the like. In the first embodiment, the processor 1 of each of the guest terminals GT1, GT2, and GT3 is not necessarily be operable as the first acquisition unit 11, the second acquisition unit 12, and the control unit 13. The processor 1 is, e.g., a CPU. The processor 1 can also be an MPU, a GPU, an ASIC, an FPGA, or the like. Furthermore, the processor 1 can be a single CPU and can also be a plurality of CPUs.

The first acquisition unit 11 acquires reproduction environment information input on the terminals HT, GT1, GT2, and GT3 participating in the online conversation. The reproduction environment information is information on the sound reproduction environment of the voice reproduction device 4 used in each of the terminals HT, GT1, GT2, and GT3. This information on the sound reproduction environment contains information indicating a device to be used as the voice reproduction device 4. The information indicating a device to be used as the voice reproduction device 4 is information indicating which of, for example, stereo loudspeakers, headphones, and earphones are used as the voice reproduction device 4. When the stereo loudspeakers are used as the voice reproduction device 4, the information on the sound reproduction environment also contains information indicating, for example, the distance between the right and left loudspeakers.

The second acquisition unit 12 acquires azimuth information input on the terminal HT participating in the online conversation. The azimuth information is information of sound image localization directions with respect to each of the terminal users including the user HU of the terminal HT.

The control unit 13 performs control for reproducing sound images on the individual terminals including the terminal HT based on the reproduction environment information and the azimuth information. For example, based on the reproduction environment information and the azimuth information, the control unit 13 generates sound image filter coefficients suitable for the individual terminals, and transmits the generated sound image filter coefficients to these terminals. The sound image filter coefficient is a coefficient that is convoluted in right and left voice signals to be input to the voice reproduction device 4. For example, the sound image filter coefficient is generated based on a head transmission function C as the voice transmission characteristic between the voice reproduction device 4 and the head (the two ears) of a user, and a head transmission coefficient d as the voice transmission characteristic between a virtual sound source specified in accordance with the azimuth information and the head (the two ears) of the user. For example, the storage 3 stores a table of the head transmission function C of each reproduction environment information and a table of the head transmission function d of each azimuth information. The control unit 13 acquires the head transmission functions C and d in accordance with the reproduction environment information of each terminal acquired by the first acquisition unit 11 and the azimuth information of the terminal acquired by the second acquisition unit 12, thereby generating a sound image filter coefficient of each of the terminals.

The memory 2 includes a ROM and a RAM. The ROM is a nonvolatile memory. The ROM stores an activation program of the terminal and the like. The RAM is a volatile memory. The RAM is used as a work memory when, for example, the processor 1 performs processing.

The storage 3 is a storage such as a hard disk drive or a solid-state drive. The storage 3 stores various programs to be executed by the processor 1, such as an online conversation management program 31. The online conversation management program 31 is an application program that is downloaded from a predetermined download server or the like, and is a program for executing various kinds of processing pertaining to online conversation in the online conversation system. The storage 3 of each of the guest terminals GT1, GT2, and GT3 need not store the online conversation management program 31.

The voice reproduction device 4 is a device for reproducing voices. The voice reproduction device 4 according to this embodiment is a device capable of reproducing voices, and can include stereo loudspeakers, headphones, or earphones. When the voice reproduction device 4 reproduces a sound image signal that is a voice signal in which the above-described sound image filter coefficient is convoluted, a sound image is localized in a space around the head of the user. In this embodiment, the voice reproduction devices 4 of the individual terminals can be either identical or different. Also, the voice reproduction device 4 can be either a device incorporated into the terminal or an external device capable of communicating with the terminal.

The voice detection device 5 detects input of the voice of the user operating the terminal. For example, the voice detection device 5 is a microphone. The microphone of the voice detection device 5 can be either a stereo microphone or a monaural microphone. Also, the voice detection device 5 can be either a device incorporated into the terminal or an external device capable of communicating with the terminal.

The display device 6 is a display device such as a liquid crystal display or an organic EL display. The display device 6 displays various screens such as an input screen to be explained later. Also, the display device 6 can be either a display device incorporated into the terminal or an external display device capable of communicating with the terminal.

The input device 7 is an input device such as a touch panel, a keyboard, or a mouse. When the input device 7 is operated, a signal corresponding to the contents of the operation is input to the processor 1. The processor 1 performs various kinds of processing corresponding to the signal.

The communication device 8 is a communication device for allowing the terminal to mutually communicate with other terminals across the network NW. The communication device 8 can be either a communication device for wired communication or a communication device for wireless communication.

Figure 3:
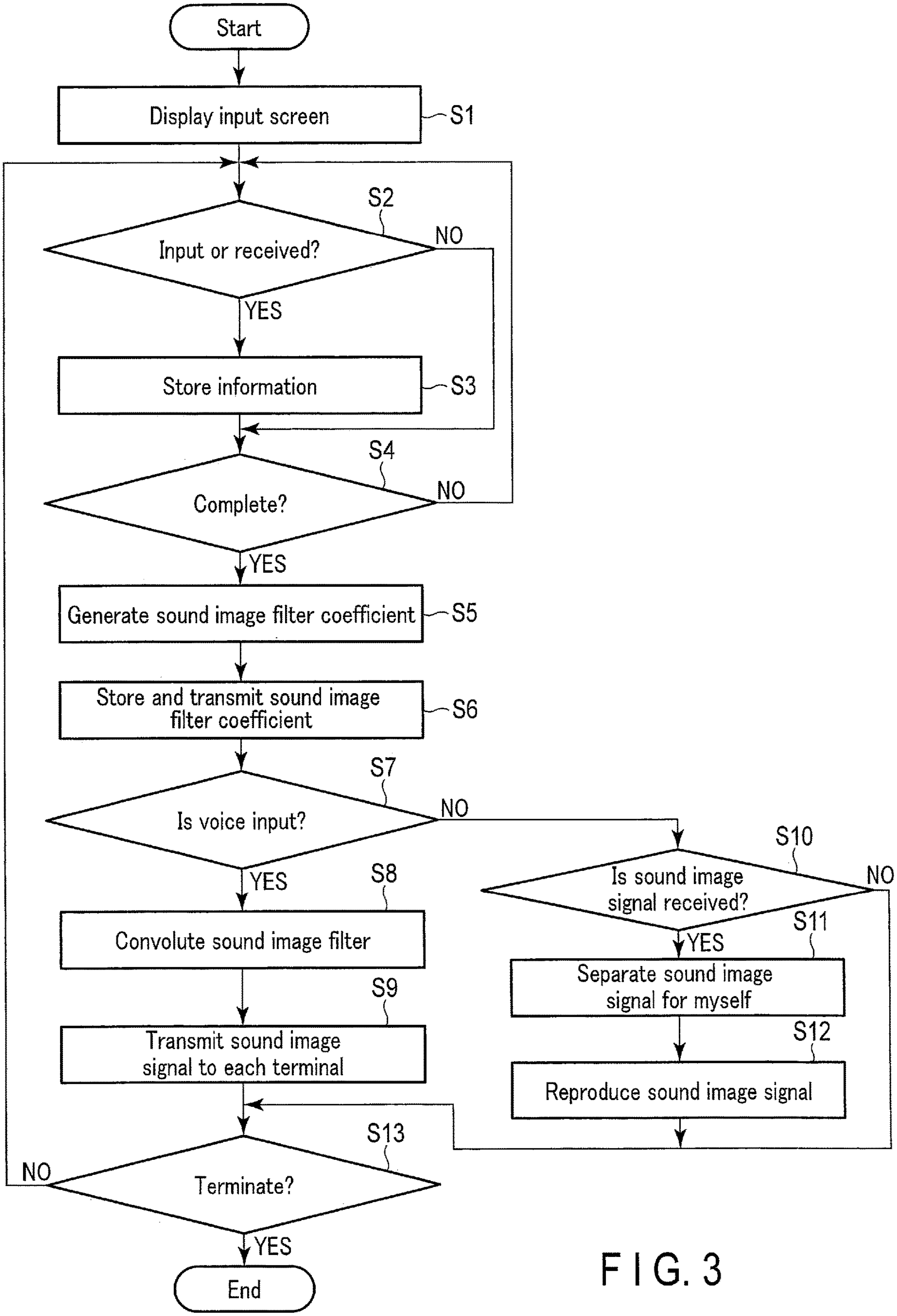
FIG. 3 is a flowchart showing the operation of an example of online conversation of a host terminal.
Figure 4:
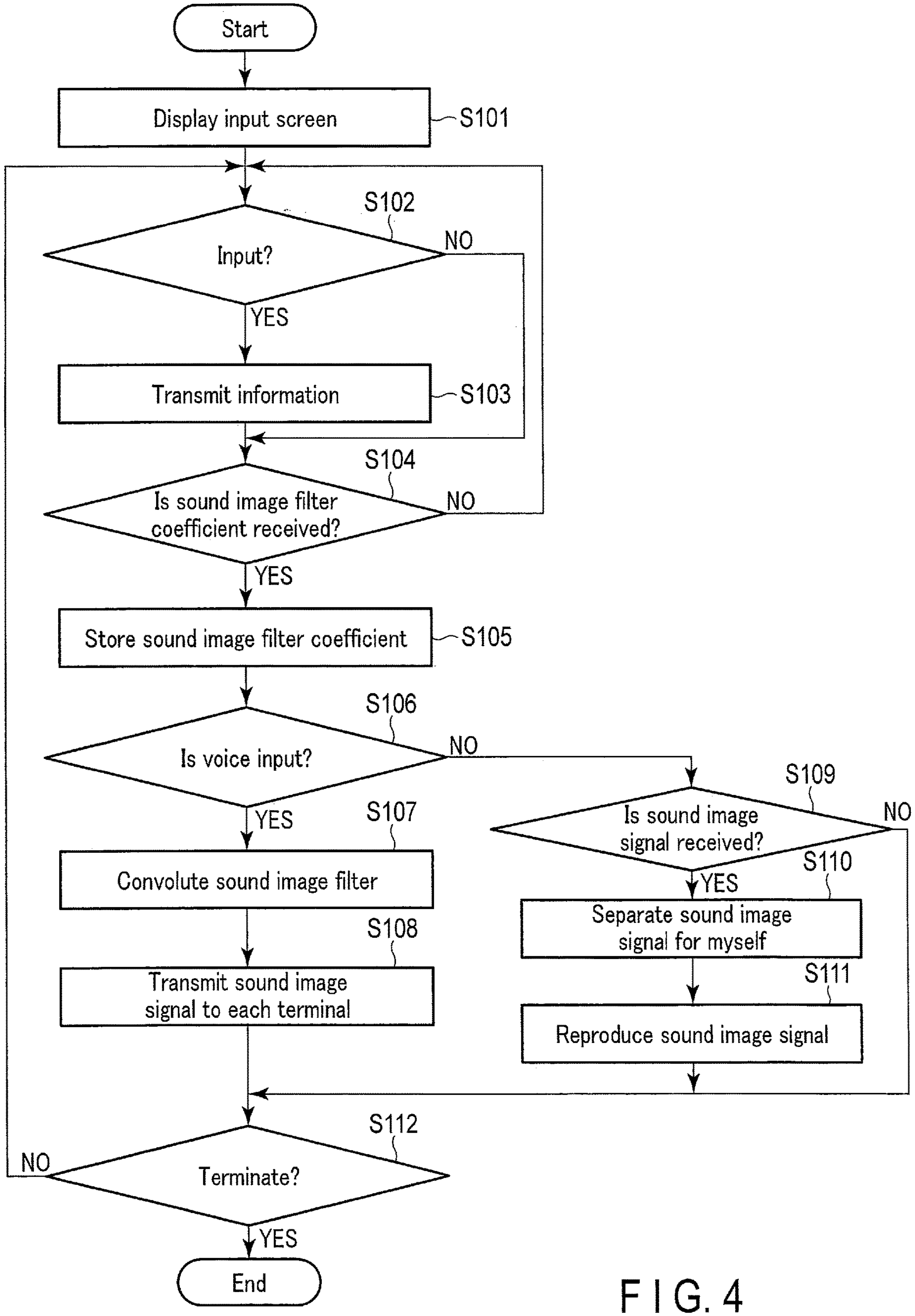
FIG. 4 is a flowchart showing the operation of an example of online conversation of a guest terminal.

The operation of the online conversation system according to the first embodiment will be explained below. FIG. 3 is a flowchart showing an operation example of online conversation on the host terminal HT. FIG. 4 is a flowchart showing an operation example of online conversation on the guest terminals GT1, GT2, and GT3. The processor 1 of the host terminal HT executes the operation of FIG. 3. The processors 1 of the guest terminals GT1, GT2, and GT3 execute the operation of FIG. 4.

Figure 5:
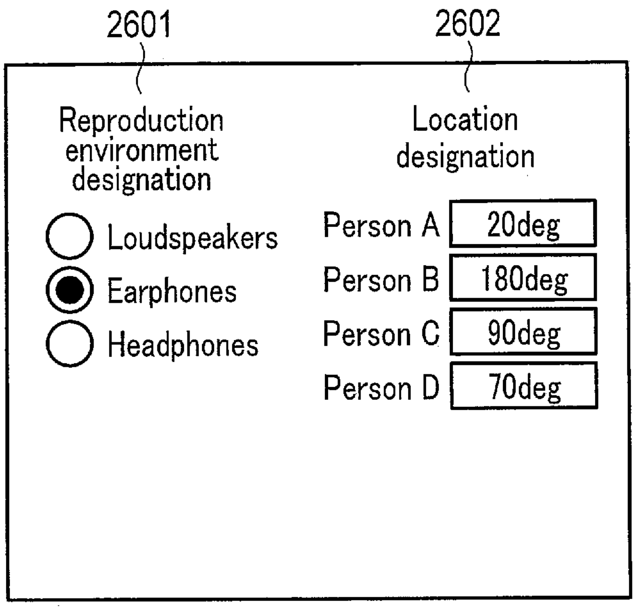
FIG. 5 is a view showing an example of a screen for inputting reproduction environment information and azimuth information.

First, the operation of the terminal HT will be explained. In step S1, the processor 1 of the terminal HT displays the screen for inputting the reproduction environment information and the azimuth information on the display device 6. Data for displaying the input screen of the reproduction environment information and the azimuth information can be stored in, e.g., the storage 3 of the terminal HT in advance. FIG. 5 is a view showing the input screen of the reproduction environment information and the azimuth information to be displayed on the display device 6 of the terminal HT.

As shown in FIG. 5, the reproduction environment information input screen includes a list 2601 of devices assumed to be used as the voice reproduction device 4. The user HU of the terminal HT selects the voice reproduction device 4 to be used from the list 2601.

Also, as shown in FIG. 5, the azimuth information input screen includes a field 2602 for inputting the azimuths of users including the user HU. In FIG. 5, “Person A” is the user HU, “Person B” is the user GU1, “Person C” is the user GU2, and “Person D” is the user GU3. Note that this azimuth is an azimuth obtained when a predetermined reference direction, e.g., the direction of the front of each user is 0°. In the first embodiment, the host user HU inputs the azimuth information of the users GU1, GU2, and GU3. In this case, the user HU can designate the azimuth information of each user within the range of 0° to 359°. However, if pieces of azimuth information are the same, the sound images of a plurality users are localized in the same direction. Therefore, if the same azimuth is input for a plurality of users, the processor 1 can display an error message or the like on the display device 6.

Referring to FIG. 5, one screen includes both the reproduction environment information input screen and the azimuth information input screen. However, the reproduction environment information input screen and the azimuth information input screen can also be different screens. In this case, for example, the reproduction environment information input screen is displayed first, and the azimuth information input screen is displayed after input of the reproduction environment information is complete.

In step S2, the processor 1 determines whether the user HU has input the reproduction environment information and the azimuth information or the reproduction environment information is received from the terminals GT1, GT2, and GT3. If it is determined in step S2 that the user HU has input the reproduction environment information and the azimuth information or the reproduction environment information is received from the terminals GT1, GT2, and GT3, the process advances to step S3. If it is determined in step S2 that the user HU has not input the reproduction environment information and the azimuth information or the reproduction environment information is not received from the terminals GT1, GT2, and GT3, the process advances to step S4.

In step S3, the processor 1 stores the input or received information in, e.g., the RAM of the memory 2.

In step S4, the processor 1 determines whether the information input is complete, i.e., whether the reproduction environment information and the azimuth information of each terminal are completely stored in the RAM or the like. If it is determined in step S4 that the information input is incomplete, the process returns to step S2. If it is determined in step S4 that the information input is complete, the process advances to step S5.

In step S5, the processor 1 generates a sound image filter coefficient for each terminal, i.e., for the user of each terminal, based on the reproduction environment information and the azimuth information of the terminal.

For example, a sound image filter coefficient for the user HU includes a sound image filter coefficient generated based on the reproduction environment information of the voice reproduction device 4 of the terminal GT1, which is input by the user GU1, and the azimuth information of the user HU, which is designated by the user HU, a sound image filter coefficient generated based on the reproduction environment information of the voice reproduction device 4 of the terminal GT2, which is input by the user GU2, and the azimuth information of the user HU, which is designated by the user HU, and a sound image filter coefficient generated based on the reproduction environment information of the voice reproduction device 4 of the terminal GT3, which is input by the user GU3, and the azimuth information of the user HU, which is designated by the user HU.

A sound image filter coefficient for the user GU1 includes a sound image filter coefficient generated based on the reproduction environment information of the voice reproduction device 4 of the terminal HT, which is input by the user HU, and the azimuth information of the user GU1, which is designated by the user HU, a sound image filter coefficient generated based on the reproduction environment information of the voice reproduction device 4 of the terminal GT2, which is input by the user GU2, and the azimuth information of the user GU1, which is designated by the user HU, and a sound image filter coefficient generated based on the reproduction environment information of the voice reproduction device 4 of the terminal GT3, which is input by the user GU3, and the azimuth information of the user GU1, which is designated by the user HU.

It is possible to similarly generate sound image filter coefficients for the users GU2 and GU3. That is, the sound image filter coefficient for the user GU2 can be generated based on the reproduction environment information of terminals except for the reproduction environment information of the voice reproduction device 4 of the terminal GT2, which is input by the user GU2, and the azimuth information of the user GU2, which is designated by the user HU. Likewise, the sound image filter coefficient for the user GU3 can be generated based on the reproduction environment information of terminals except for the reproduction environment information of the voice reproduction device 4 of the terminal GT3, which is input by the user GU3, and the azimuth information of the user GU3, which is designated by the user HU.

In step S6, the processor 1 stores the sound image filter coefficient generated for the user HU in, e.g., the storage 3. Also, the processor 1 transmits the sound image filter coefficients generated for the users GU1, GU2, and GU3 to the terminals of these users by using the communication device 8. Thus, initialization for the online conversion is complete.

In step S7, the processor 1 determines whether the voice of the user HU is input via the voice detection device 5. If it is determined in step S7 that the voice of the user HU is input, the process advances to step S8. If it is determined in step S7 that the voice of the user HU is not input, the process advances to step S10.

In step S8, the processor 1 convolutes the sound image filter coefficient for the user HU in a voice signal based of the voice of the user HU input via the voice detection device 5, thereby generating sound image signals for other users.

In step S9, the processor 1 transmits the sound image signals for the other users to the terminals GT1, GT2, and GT3 by using the communication device 8. After that, the process advances to step S13.

In step S10, the processor 1 determines whether a sound image signal is received from another terminal via the communication device 8. If it is determined in step S10 that a sound image signal is received from another terminal, the process advances to step S11. If it is determined in step S10 that no sound image signal is received from any other terminal, the process advances to step S13.

In step S11, the processor 1 separates a sound image signal for the user HU from the received sound image signal. For example, if the sound image signal is received from the terminal GT1, the processor 1 separates a sound image signal in which the sound image filter coefficient generated based on the reproduction environment information of the voice reproduction device 4 of the terminal HT, which is input by the user HU, and the azimuth information of the user GU1, which is designated by the user HU, is convoluted.

In step S12, the processor 1 reproduces the sound image signal by the voice reproduction device 4. After that, the process advances to step S13.

In step S13, the processor 1 determines whether to terminate the online conversation. For example, if the user HU designates the termination of the online conversation by operating the input device 7, it is determined that the online conversation is to be terminated. If it is determined in step S13 that the online conversation is not to be terminated, the process returns to step S2. In this case, if the reproduction environment information or the azimuth information is changed during the online conversation, the processor 1 regenerates the sound image filter coefficient by reflecting the change, and continues the online conversation. If it is determined in step S13 that the online conversation is to be terminated, the processor 1 terminates the process shown in FIG. 3.

Next, the operations of the terminals GT1, GT2, and GT3 will be explained. Since the operations of the terminals GT1, GT2, and GT3 are the same, the operation of the terminal GT1 will be explained below as a representative.

Figure 6:
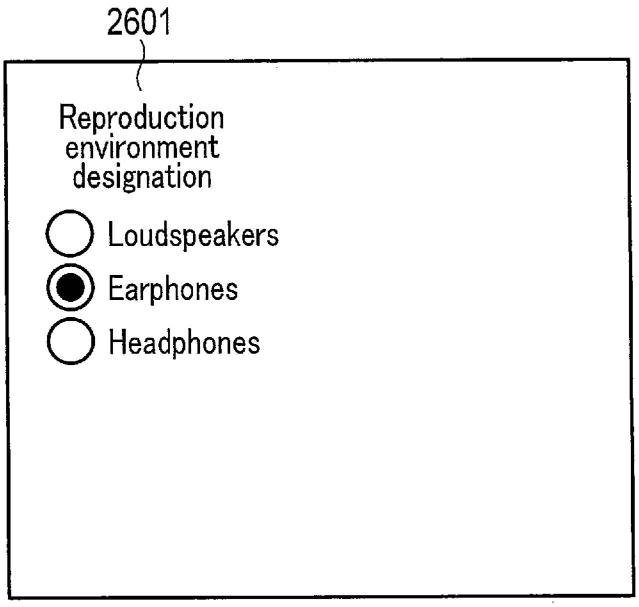
FIG. 6 is a view showing an example of the reproduction environment information input screen.

In step S101, the processor 1 of the terminal GT1 displays the reproduction environment information input screen on the display device 6. Data for displaying the reproduction environment information input screen can be stored in the storage 3 of the terminal GT1 in advance. FIG. 6 is a view showing an example of the reproduction environment information input screen to be displayed on the display devices 6 of the terminals GT1, GT2, and GT3. As shown in FIG. 6, the reproduction environment information input screen includes the list 2601 of devices assumed to be used as the voice reproduction device 4. That is, the reproduction environment information input screen of the terminals HT and the reproduction environment information input screen of the terminals GT1, GT2, and GT3 can be the same. Data of the reproduction environment information input screen of the terminal GT1 can be stored in the storage 3 of the terminal HT. In this case, in step S1 of FIG. 3, the processor 1 of the terminal HT transmits the data of the reproduction environment information input screen of the terminals GT1, GT2, and GT3 to these terminals. In this case, the data for displaying the reproduction environment information input screen need not be stored in the storages 3 of the terminals GT1, GT2, and GT3 beforehand.

In step S102, the processor 1 determines whether the user GU1 has input the reproduction environment information. If it is determined in step S102 that the user GU1 has input the reproduction environment information, the process advances to step S103. If it is determined in step S102 that the user GU1 has not input the reproduction environment information, the process advances to step S104.

In step S103, the processor 1 transmits the input reproduction environment information to the terminal HT by using the communication device 8.

In step S104, the processor 1 determines whether the sound image filter coefficient for the user GU1 is received from the terminal HT. If it is determined in step S104 that the sound image filter coefficient for the user GU1 is not received, the process returns to step S102. If it is determined in step S104 that the sound image filter coefficient for the user GU1 is received, the process advances to step S105.

In step S105, the processor 1 stores the received sound image filter coefficient for the user GU1 in, e.g., the storage 3.

In step S106, the processor 1 determines whether the voice of the user GU1 is input via the voice detection device 5. If it is determined in step S106 that the voice of the user GU1 is input, the process advances to step S107. If it is determined in step S106 that the voice of the user GU1 is not input, the process advances to step S109.

In step S107, the processor 1 convolutes the sound image filter coefficient for the user GU1 in a voice signal based on the voice of the user GU1 input via the voice detection device 5, thereby generating sound image signals for other users.

In step S108, the processor 1 transmits the sound image signals for the other users to the terminals HT, GT2, and GT3 by using the communication device 8. After that, the process advances to step S112.

In step S109, the processor 1 determines whether a sound image signal is received from another terminal via the communication device 8. If it is determined in step S109 that a sound image signal is received from another terminal, the process advances to step S110. If it is determined in step S109 that no sound image signal is received from any other terminal, the process advances to step S112.

In step S110, the processor 1 separates a sound image signal for the user GU1 from the received sound image signal. For example, if the sound image signal is received from the terminal HT, the processor 1 separates a sound image signal in which the sound image filter coefficient generated based on the reproduction environment information of the voice reproduction device 4 of the terminal GT1, which is input by the user GU1 and the azimuth information of the user HU, which is designated by the user HU, is convoluted.

In step S111, the processor 1 reproduces the sound image signal by using the voice reproduction device 4. After that, the process advances to step S112.

In step S112, the processor 1 determines whether to terminate the online conversation. For example, if the user GU1 designates the termination of the online conversation by operating the input device 7, it is determined that the online conversation is to be terminated. If it is determined in step S112 that the online conversation is not to be terminated, the process returns to step S102. In this case, if the reproduction environment information is changed during the online conversation, the processor 1 transmits this reproduction environment information to the terminal HT and continues the online conversation. If it is determined in step S112 that the online conversation is to be terminated, the processor 1 terminates the process shown in FIG. 4.

Figure 7A:
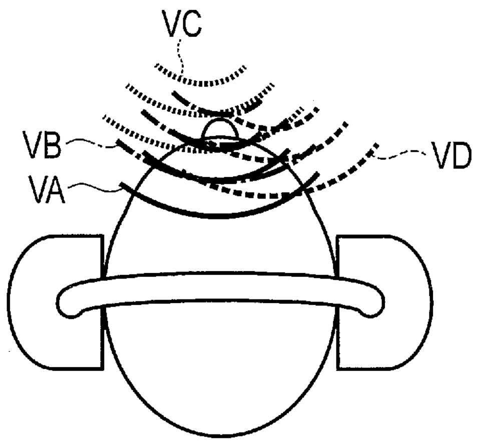
FIG. 7A is a schematic view of a state in which the voices of a plurality of users are concentratedly heard.
Figure 7B:
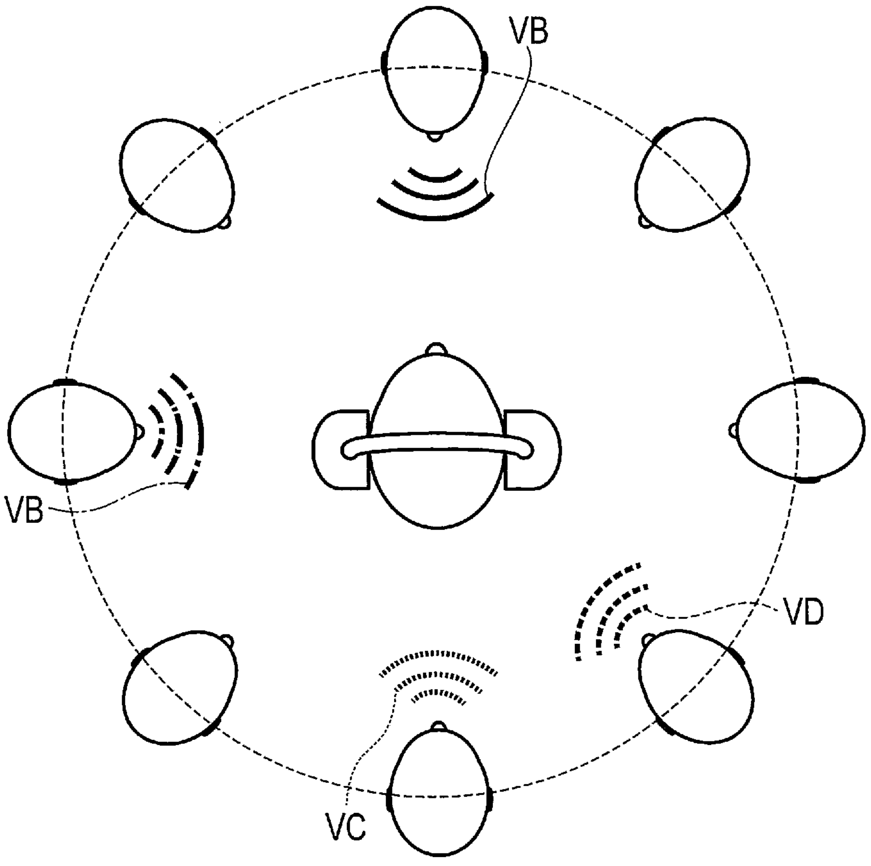
FIG. 7B is a schematic view of a state in which sound images are correctly localized.

In the first embodiment as described above, a sound image filter coefficient for the user of each terminal is generated in the host terminal HT based on the reproduction environment information and the azimuth information. Consequently, in accordance with the reproduction environment of the voice reproduction device 4 of each terminal, the sound images of other users can be localized. For example, if a plurality of users simultaneously speak, voices VA, VB, VC, and VD of the plurality of users are concentratedly heard as shown in FIG. 7A. In the first embodiment, however, the voices VA, VB, VC, and VD of the plurality of users are localized in different azimuths around the head of each user in accordance with the designation by the host user HU. As shown in FIG. 7B, therefore, this can provide each user with an illusion that the voices VA, VB, VC, and VD of the plurality of users are heard from different azimuths. This enables each user to distinguish between the voices VA, VB, VC, and VD of the plurality of users.

The generation of the sound image filter coefficient requires the reproduction environment information and the azimuth information. On the other hand, the host terminal cannot directly confirm the reproduction environment of the voice reproduction device of each guest terminal. In the first embodiment, however, each guest terminal transmits the reproduction environment information to the host terminal, and the host terminal generates a sound image filter coefficient of the terminal. As described above, the first embodiment is particularly suitable for an online conversation environment in which one terminal collectively manages the sound image filter coefficients.

In this embodiment, the host terminal generates a new sound image filter coefficient whenever acquiring the reproduction environment information and the azimuth information. However, if the host terminal and the guest terminals previously share a plurality of sound image filter coefficients that are assumed to be used, the host terminal can also determine a necessary sound image filter coefficient from the shared sound image filter coefficients whenever acquiring the reproduction environment information and the azimuth information. Instead of transmitting the sound image filter coefficient to each guest terminal, the host terminal can transmit only information of an index representing the determined sound image filter coefficient to each guest terminal. In this case, it is unnecessary to sequentially generate sound image filter coefficients during the online conversation.

Also, the first embodiment does not particularly refer to the transmission/reception of information other than voices during the online conversation. In the first embodiment, it is also possible to transmit/receive, e.g., video images other than voices.

Furthermore, the host terminal generate a sound image filter coefficient in the first embodiment. However, the host terminal does not necessarily generate a sound image filter coefficient. A sound image filter coefficient can be generated by a given guest terminal, and can also be generated by a device, such as a server, other than a terminal participating in the online conversation. In this case, the host terminal transmits, to the server or the like, the reproduction environment information and the azimuth information of each guest terminal participating in the online conversation, including the reproduction environment information acquired from each guest terminal.

Second Embodiment

Figure 8:
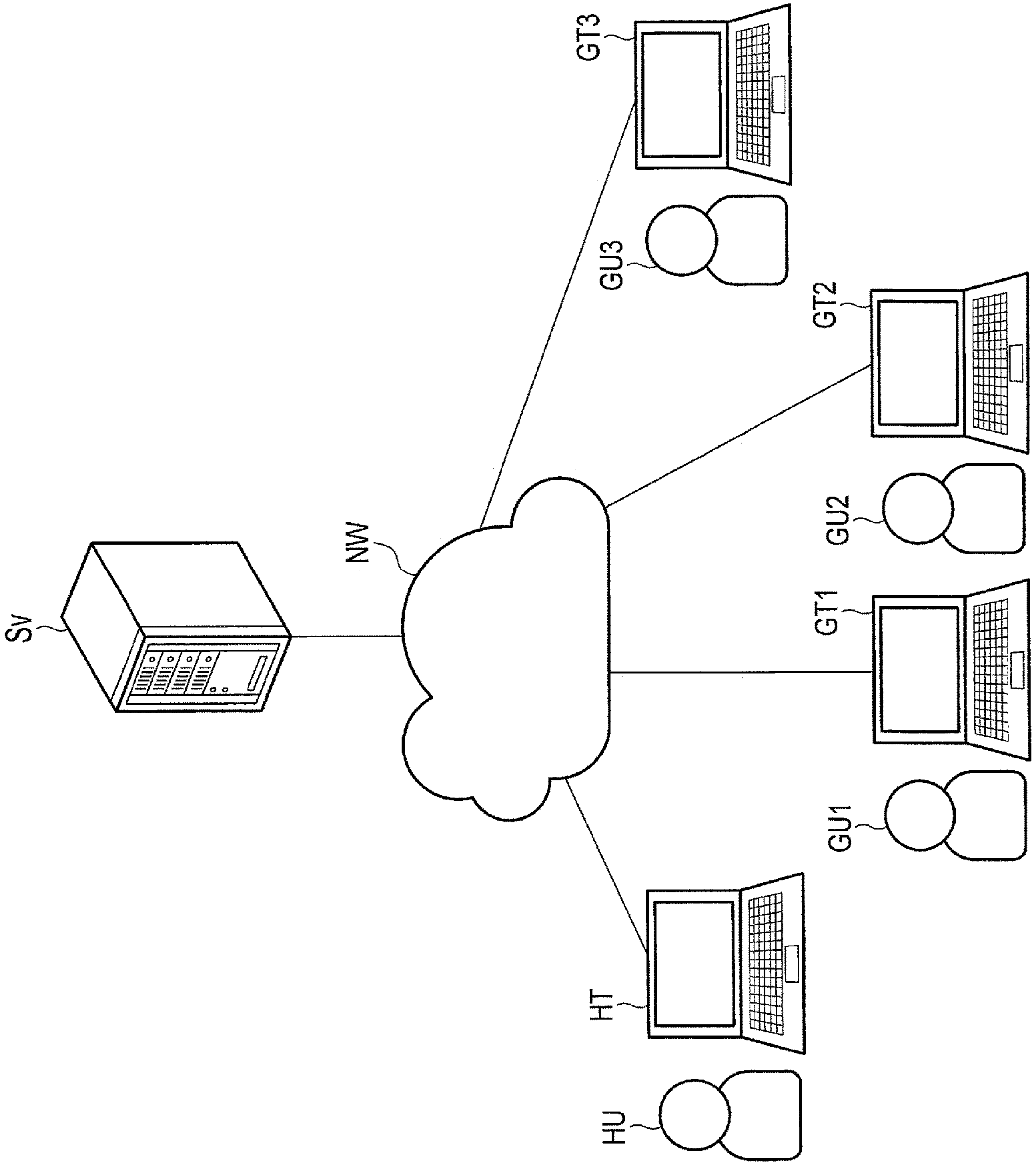
FIG. 8 is a view showing the configuration of an online conversation system including an online conversation management apparatus according to the second embodiment.

The second embodiment will be explained below. FIG. 8 is a view showing the configuration of an example of an online conversation system including an online conversation management apparatus according to the second embodiment. In this online conversation system shown in FIG. 8, a plurality of terminals, i.e., four terminals HT, GT1, GT2, and GT3 in FIG. 8 are communicably connected across a network NW, and users HU, GU1, GU2, and GU3 of these terminals perform conversation via the terminals HT, GT1, GT2, and GT3, in the same manner as in FIG. 1. The terminal HT is a host terminal to be operated by the user HU as a host of the online conversation, and the terminals GT1, GT2, and GT3 are guest terminals to be operated by the guest users GU1, GU2, and GU3 participating as guests in the online conversation, in the second embodiment as well.

In the second embodiment, a server Sv is further connected so that the server Sv can communicate with the terminals HT, GT1, GT2, and GT3 across the network NW. In the second embodiment, the server Sv collectively performs control for localizing sound images in a space around the head of each of the users HU, GU1, GU2, and GU3 when performing the conversation using the terminals HT, GT1, GT2, and GT3. The server Sv shown in FIG. 8 can also be a cloud server.

The online conversation system of the second embodiment shown in FIG. 8 is supposed to be applied to, e.g., an online meeting or an online lecture.

Figure 9:
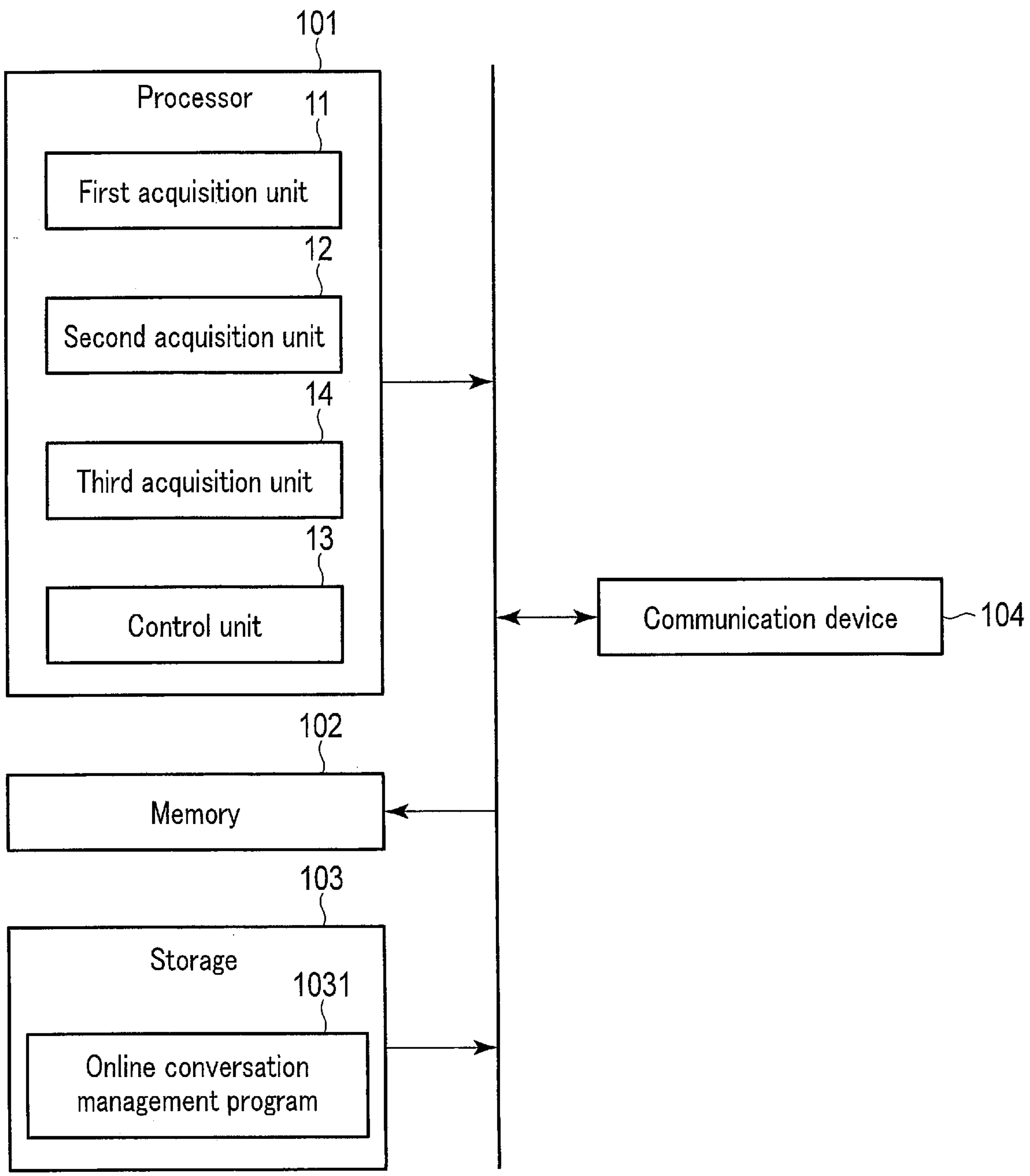
FIG. 9 is a view showing the configuration of an example of a server.

FIG. 9 is a view showing the configuration of an example of the server Sv. Note that the terminals HT, GT1, GT2, and GT3 can have the configuration shown in FIG. 2. Accordingly, an explanation of the configuration of the terminals HT, GT1, GT2, and GT3 will be omitted. As shown in FIG. 9, the server Sv includes a processor 101, a memory 102, a storage 103, and a communication device 104. Note that the server Sv does not necessarily have the same elements as those shown in FIG. 9. The server Sv need not have some of the elements shown in FIG. 9, and can have elements other than those shown in FIG. 9.

The processor 101 controls the overall operation of the server Sv. The processor 101 of the server Sv operates as a first acquisition unit 11, a second acquisition unit 12, a third acquisition unit 14, and a control unit 13 by executing programs stored in, e.g., the storage 103. In the second embodiment, the processor 1 of each of the host terminal HT and the guest terminals GT1, GT2, and GT3 is not necessarily operable as the first acquisition unit 11, the second acquisition unit 12, the third acquisition unit 14, and the control unit 13. The processor 101 is, e.g., a CPU. The processor 101 can also be an MPU, a GPU, an ASIC, an FPGA, or the like. The processor 101 can be a single CPU or the like, and can also be a plurality of CPUs or the like.

The first acquisition unit 11 and the second acquisition unit 12 are the same as the first embodiment, so an explanation thereof will be omitted. Also, the control unit 13 performs control for reproducing sound images at each of the terminals including the terminal HT based on reproduction environment information and azimuth information, in the same manner as explained in the first embodiment.

The third acquisition unit 14 acquires utilization information of the terminals HT, GT1, GT2, and GT3 participating in the online conversation. The utilization information is information on the utilization of sound images to be used on the terminals HT, GT1, GT2, and GT3. This utilization information contains, e.g., an attribute to be allocated to a user participating in the online conversation. In addition, the utilization information contains information of the group setting of a user participating in the online conversation. The utilization information can also contain other various kinds of information about the utilization of sound images.

The memory 102 includes a ROM and a RAM. The ROM is a nonvolatile memory. The ROM stores, e.g., an activation program of the server Sv. The RAM is a volatile memory. The RAM is used as, e.g., a work memory when the processor 101 performs processing.

The storage 103 is a storage such as a hard disk drive or a solid-state drive. The storage 103 stores various programs such as an online conversation management program 1031 to be executed by the processor 101. The online conversation management program 1031 is a program for executing various kinds of processing for the online conversation in the online conversation system.

The communication device 104 is a communication device to be used by the server Sv to communicate with each terminal across the network NW. The communication device 104 can be either a communication device for wired communication or a communication device for wireless communication.

Figure 10:
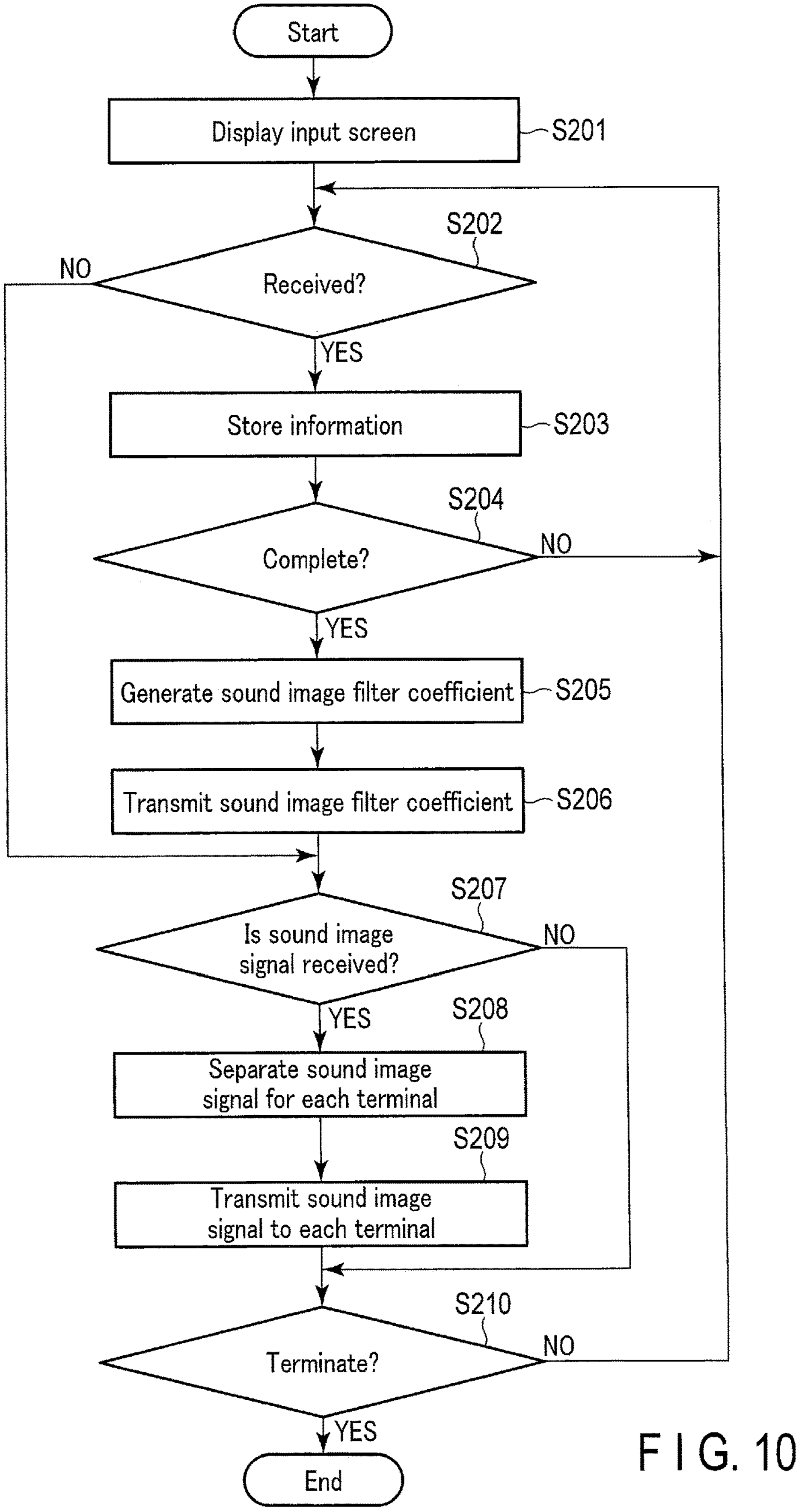
FIG. 10 is a flowchart showing the operation of the first example of online conversation of the server.

Next, the operation of the online conversation system according to the second embodiment will be explained. FIG. 10 is a flowchart showing the first operation example when the server Sv performs the online conversation. The operations of the host terminal HT and the guest terminals GT1, GT2, and GT3 are basically the same as those shown in FIG. 4.

In step S201, the processor 101 transmits data of a screen for inputting the reproduction environment information and the azimuth information to the terminals HT, GT1, GT2, and GT3. That is, in the second embodiment, the input screen of the reproduction environment information and the azimuth information shown in FIG. 5 is displayed not only on the host terminal HT but also on the guest terminals GT1, GT2, and GT3. Accordingly, the guest users GU1, GU2, and GU3 can also designate the localization direction of a sound image. Note that the processor 101 can further transmit data for a utilization information input screen to the terminals HT, GT1, GT2, and GT3.

In step S202, the processor 101 determines whether the reproduction environment information and the azimuth information are received from the terminals HT, GT1, GT2, and GT3. If it is determined in step S202 that the reproduction environment information and the azimuth information are received from the terminals HT, GT1, GT2, and GT3, the process advances to step S203. If it is determined in step S202 that the reproduction environment information and the azimuth information are not received from the terminals HT, GT1, GT2, and GT3, the process advances to step S207.

In step S203, the processor 101 stores the received information in, e.g., the RAM of the memory 102.

In step S204, the processor 101 determines whether the input of the information is complete, i.e., whether the reproduction environment information and the azimuth information of each terminal are completely stored in the RAM or the like. If it is determined in step S204 that the input of the information is incomplete, the process returns to step S202. If it is determined in step S204 that the input of the information is complete, the process advances to step S205.

In step S205, the processor 101 generates a sound image filter coefficient for each terminal, i.e., the user of each terminal, based on the reproduction environment information and the azimuth information of the terminal.

For example, a sound image filter coefficient for the user HU includes a sound image filter coefficient generated based on the reproduction environment information of the voice reproduction device 4 of the terminal GT1, which is input by the user GU1, and the azimuth information of the user HU, which is designated by each of the users HU, GU1, GU2, and GU3, a sound image filter coefficient generated based on the reproduction environment information of the voice reproduction device 4 of the terminal GT2, which is input by the user GU2, and the azimuth information of the user HU, which is designated by each of the users HU, GU1, GU2, and GU3, and a sound image filter coefficient generated based on the reproduction environment information of the voice reproduction device 4 of the terminal GT3, which is input by the user GU3, and the azimuth information of the user HU, which is designated by each of the users HU, GU1, GU2, and GU3.

Also, a sound image filter coefficient for the user GU1 includes a sound image filter coefficient generated based on the reproduction environment information of the voice reproduction device 4 of the terminal HT, which is input by the user HU, and the azimuth information of the user GU1, which is designated by each of the users HU, GU2, and GU3, a sound image filter coefficient generated based on the reproduction environment information of the voice reproduction device 4 of the terminal GT2, which is input by the user GU2, and the azimuth information of the user GU1, which is designated by each of the users HU, GU1, GU2, and GU3, and a sound image filter coefficient generated based on the reproduction environment information of the voice reproduction device 4 of the terminal GT3, which is input by the user GU3, and the azimuth information of the user GU1, which is designated by each of the users HU, GU1, GU2, and GU3.

It is possible to similarly generate a sound image filter coefficient for the user GU2 and a sound image filter coefficient for the user GU3. That is, a sound image filter coefficient for the user GU2 includes a sound image filter coefficient generated based on the reproduction environment information of terminals except the reproduction environment information of the voice reproduction device 4 of the terminal GT2, which is input by the user GU2, and the azimuth information of the user GU2, which is designated by each of the users HU, GU1, GU2, and GU3. Also, a sound image filter coefficient for the user GU3 includes a sound image filter coefficient generated based on the reproduction environment information of terminals except the reproduction environment information of the voice reproduction device 4 of the terminal GT3, which is input by the user GU3, and the azimuth information of the user GU3, which is designated by each of the users HU, GU1, GU2, and GU3.

In step S206, the processor 101 transmits the sound image filter coefficients generated for the users HU, GU1, GU2, and GU3 to their terminals by using the communication device 104. Consequently, initialization for the online conversation is complete.

In step S207, the processor 101 determines whether a sound image signal is received from at least one of the terminals HT, GT1, GT2, and GT3 via the communication device 104. If it is determined in step S207 that a sound image signal is received from at least one terminal, the process advances to step S208. If it is determined in step S207 that no sound image signal is received from any terminal, the process advances to step S210.

In step S208, the processor 101 separates a sound image signal for each user from the received sound image signal. For example, if a sound image signal is received from the terminal HT, the processor 101 separates, as a sound image signal for the user GU1, a sound image signal in which a sound image filter coefficient generated based on the reproduction environment information of the voice reproduction device 4 of the terminal GT1, which is input by the user GU1, and the azimuth information of the user HU, which is designated by the user GU1, is convoluted. Similarly, the processor 101 separates, as a sound image signal for the user GU2, a sound image signal in which a sound image filter coefficient generated based on the reproduction environment information of the voice reproduction device 4 of the terminal GT2, which is input by the user GU2, and the azimuth information of the user HU, which is designated by the user GU2, is convoluted. Also, the processor 101 separates, as a sound image signal for the user GU3, a sound image signal in which a sound image filter coefficient generated based on the reproduction environment information of the voice reproduction device 4 of the terminal GT3, which is input by the user GU3, and the azimuth information of the user HU, which is designated by the user GU3, is convoluted.

In step S209, the processor 101 transmits each separated sound image signal to a corresponding terminal by using the communication device 104. After that, the process advances to step S210. Note that each terminal reproduces a sound image signal received in the same manner as the processing in step S12 of FIG. 4. The processing in step S11 need not be performed because the sound image signal is separated by the server Sv. If a plurality of voice signals are received at the same timing, the processor 101 performs transmission by superposing a sound image signal for the same terminal.

In step S210, the processor 101 determines whether to terminate the online conversation. For example, if the termination of the online conversation is designated by the operations on the input devices 7 by all the users, it is determined that the online conversation is to be terminated. If it is determined in step S210 that the online conversation is not to be terminated, the process returns to step S202. In this case, if the reproduction environment information or the azimuth information is changed during the online conversation, the processor 101 regenerates a sound image filter coefficient by reflecting the change, and continues the online conversation. If it is determined in step S210 that the online conversation is to be terminated, the processor 101 terminates the process shown in FIG. 10.

Figure 11:
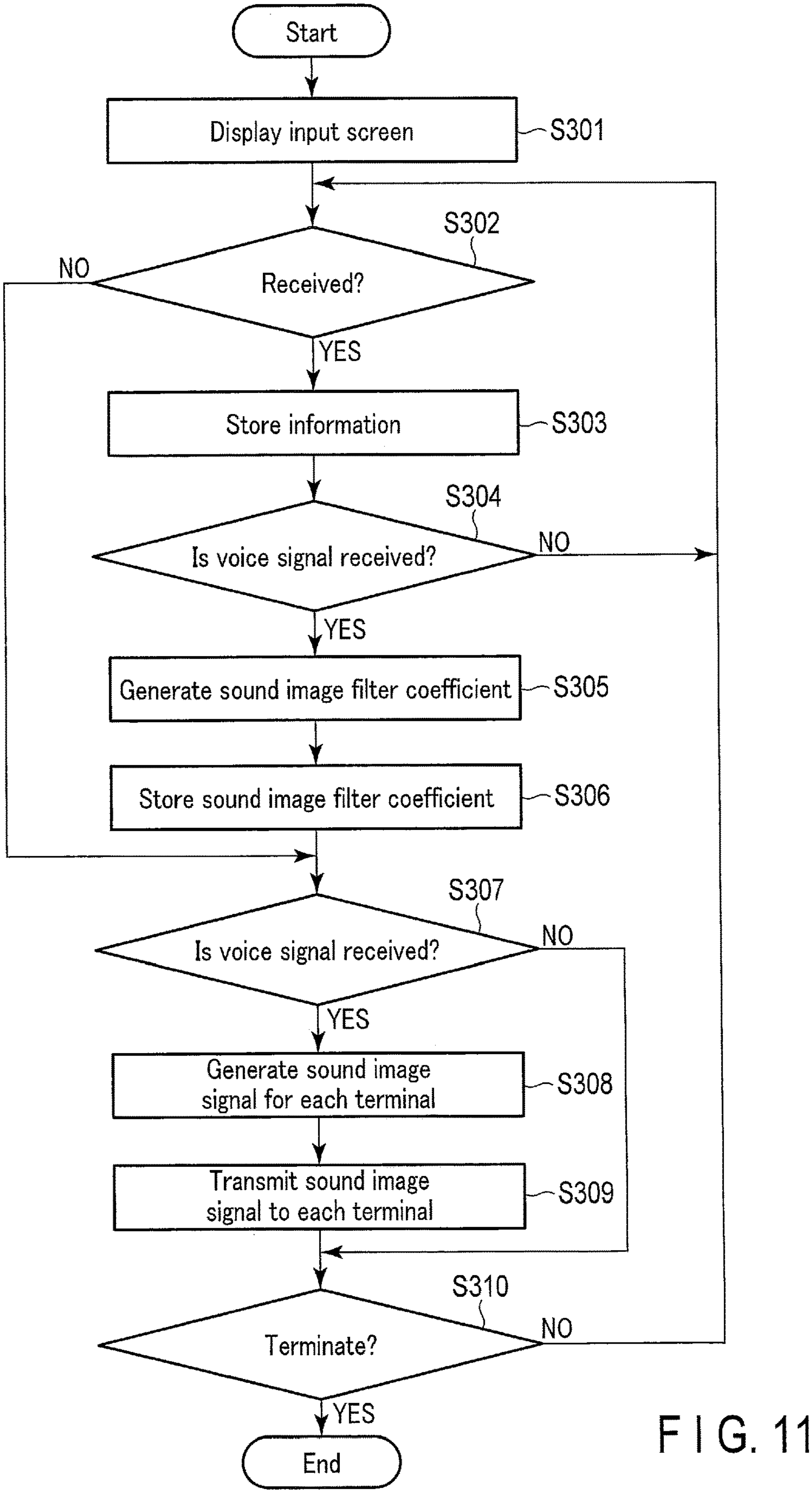
FIG. 11 is a flowchart showing the operation of the second example of online conversation of the server.

FIG. 11 is a flowchart showing the second operation example when the server Sv performs the online conversation. In the second example, the server Sv generates not only sound image filter coefficients but also a sound image signal for each terminal. Note that the operations of the host terminal HT and the guest terminals GT1, GT2, and GT3 are basically the same as those shown in FIG. 4.

In step S301, the processor 101 transmits data of a screen for inputting the reproduction environment information and the azimuth information to the terminals HT, GT1, GT2, and GT3. Note that the processor 101 can also transmit data of a utilization information input screen to the terminals HT, GT1, GT2, and GT3.

In step S302, the processor 101 determines whether the reproduction environment information and the azimuth information are received from the terminals HT, GT1, GT2, and GT3. If it is determined in step S302 that the reproduction environment information and the azimuth information are received from the terminals HT, GT1, GT2, and GT3, the process advances to step S303. If it is determined in step S302 that the reproduction environment information and the azimuth information are not received from the terminals HT, GT1, GT2, and GT3, the process advances to step S307.

In step S303, the processor 101 stores the received information in, e.g., the RAM of the memory 102.

In step S304, the processor 101 determines whether the input of the information is complete, i.e., whether the reproduction environment information and the azimuth information of each terminal are completely stored in the RAM or the like. If it is determined in step S304 that the input of the information is incomplete, the process returns to step S302. If it is determined in step S304 that the input of the information is complete, the process advances to step S305.

In step S305, the processor 101 generates a sound image filter coefficient for each terminal, i.e., for each user based on the reproduction environment information and the azimuth information of the terminal. This sound image filter coefficient generated in step S305 can be the same as the sound image filter coefficient generated in step S205 of the first example.

In step S306, the processor 101 stores the sound image filter coefficient for each user in, e.g., the storage 103.

In step S307, the processor 101 determines whether a voice signal is received from at least one of the terminals HT, GT1, GT2, and GT3 via the communication device 104. If it is determined in step S307 that a voice signal is received from at least one terminal, the process advances to step S308. If it is determined in step S307 that no voice signal is received from any terminal, the process advances to step S310.

In step S308, the processor 101 generates a sound image signal for each user from the received voice signal. For example, if a voice is received from the terminal HT, the processor 101 generates a sound image signal for the user GU1 by convoluting, in the received voice signal, a sound image filter coefficient generated based on the reproduction environment information of the voice reproduction device 4 of the terminal GT1, which is input by the user GU1, and the azimuth information of the user HU, which is designated by the user GU1. Likewise, the processor 101 generates a sound image signal for the user GU2 by convoluting, in the received voice signal, a sound image filter coefficient generated based on the reproduction environment information of the voice reproduction device 4 of the terminal GT2, which is input by the user GU2, and the azimuth information of the user HU, which is designated by the user GU2. Also, the processor 101 generates a sound image signal for the user GU3 by convoluting, in the received voice signal, a sound image filter coefficient generated based on the reproduction environment information of the voice reproduction device 4 of the terminal GT3, which is input by the user GU3, and the azimuth information of the user HU, which is designated by the user GU3. Furthermore, if utilization information is available, the processor 101 can also adjust the generated sound image signal in accordance with the utilization information. This adjustment will be explained later.

In step S309, the processor 101 transmits each generated sound image signal to a corresponding terminal by using the communication device 104. After that, the process advances to step S310. Note that each terminal reproduces the received sound image signal in the same manner as the processing in step S12 of FIG. 4. The processing in step S11 need not be performed because the sound image signal is separated in the server Sv. If a plurality of voice signals are received at the same timing, the processor 101 performs transmission by superposing a sound image signal for the same terminal.

In step S310, the processor 101 determines whether to terminate the online conversation. For example, if the termination of the online conversation is designated by the operations on the input devices 7 of all the users, it is determined that the online conversation is to be terminated. If it is determined in step S310 that the online conversation is not to be terminated, the process returns to step S302. In this case, if the reproduction environment information or the azimuth information is changed during the online conversation, the processor 101 regenerates a sound image filter coefficient by reflecting the change, and continues the online conversation. If it is determined in step S310 that the online conversation is to be terminated, the processor 101 terminates the process shown in FIG. 11.

In the first example of the second embodiment, if the server, the host terminal, and the guest terminals previously share a plurality of sound image filter coefficients that are previously assumed to be used, the server can also determine a necessary sound image filter coefficient from the shared sound image filter coefficients whenever acquiring the reproduction environment information and the azimuth information. Instead of transmitting the sound image filter coefficient to the host terminal and each guest terminal, the server can transmit only information of an index representing the determined sound image filter coefficient to the host terminal and each guest terminal. In the second example of the second embodiment, the server can also determine a necessary sound image filter coefficient from a plurality of sound image filter coefficients that are previously supposed to be used whenever the reproduction environment information and the azimuth information are acquired. Then, the server can convolute the determined sound image filter coefficient in a voice signal.

In the second embodiment as explained above, the server Sv generates a sound image filter coefficient for the user of each terminal based on the reproduction environment information and the azimuth information. This can localize the sound images of other users in accordance with the reproduction environment of the voice reproduction device 4 of each terminal. Also, in the second embodiment, not the host terminal HT but the server Sv generates a sound image filter coefficient. Accordingly, the load on the host terminal HT can be reduced during the online conversation.

Furthermore, in the second embodiment, not only the host terminal HT but also the guest terminals GT1, GT2, and GT3 designate the reproduction environment information and the azimuth information, and sound image filter coefficients are generated based on these pieces of reproduction environment information and azimuth information. Therefore, each participant of the online conversation can determine sound image reproduction azimuths around the participant.

Modification 1 of Second Embodiment

Modification 1 of the second embodiment will be explained below. In the first and second embodiments described above, the input screen including the azimuth input field 2602 shown in FIG. 5 is exemplified as the azimuth information input screen. However, it is also possible to use an input screen shown in FIG. 12 as the azimuth information input screen suitable for particularly an online meeting.

Figure 12:
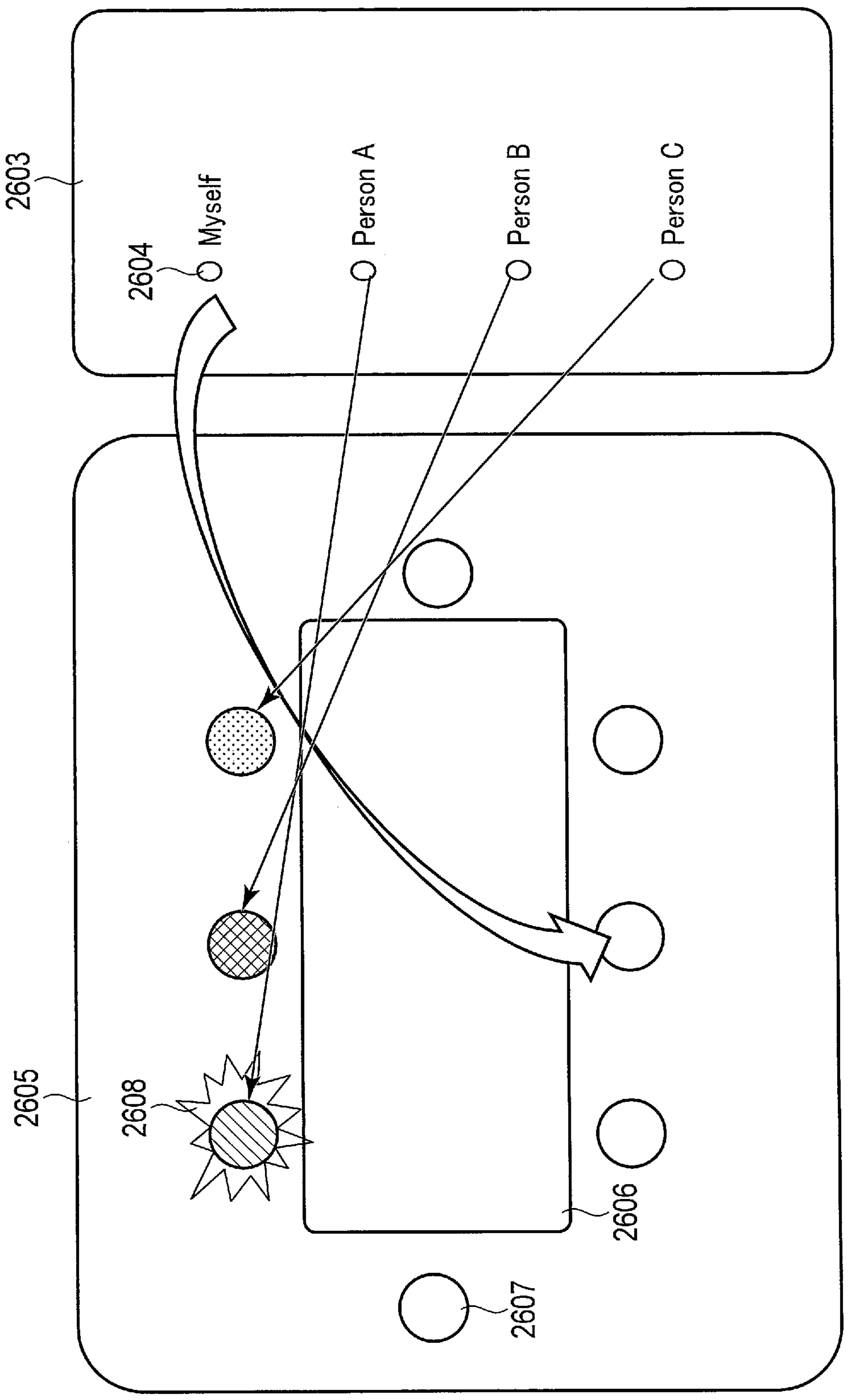
FIG. 12 is a view showing another example of the azimuth information input screen.

This azimuth information input screen shown in FIG. 12 includes a list 2603 of participants in the online meeting. In the participant list 2603, markers 2604 indicating the participants are arrayed.

The azimuth information input screen shown in FIG. 12 also includes a schematic view 2605 of the meeting room. The schematic view 2605 of the meeting room includes a schematic view 2606 of a meeting table, and a schematic view 2607 of chairs arranged around the schematic view 2606 of the meeting table. The user arranges the markers 2604 by dragging and dropping them in the schematic view 2607 of the chairs. In response to this, the processor 101 of the server Sv determines the azimuths of other users with respect to this user. That is, the processor 101 determines the azimuths of other users in accordance with the positional relationships between the marker 2604 of "myself" and the markers 2604 of "other users". Consequently, the azimuth information can be input. When sound images are localized in accordance with the input to the azimuth information input screen shown in FIG. 12, the user can hear the voices of other users as if he or she is participating in the meeting in an actual meeting room.

Since the number of chairs is limited in FIG. 12, each individual user can determine the keyman of the meeting and arrange the markers 2604 in accordance with this determination. The processor 101 of the server Sv can transmit, to the terminal, the voice of a user not arranged in any chair as an unlocalized monaural voice signal. In this case, if the user determines that the voice of another user not arranged in a chair is an important speech, the user can hear the voice of the other user in a localized state by properly switching the markers.

The azimuth information input screen shown in FIG. 12 can also be displayed during the online meeting. Even during the online meeting, the user can determine the azimuths of other users by changing the arrangement of the markers 2604. Accordingly, even when the surrounding environment of the user changes and a voice from a specific azimuth becomes difficult to hear, the user can hear the voice clearly. Furthermore, as shown in FIG. 12, the marker of a user who is speaking can emit light as indicated by reference numeral 2608.

FIG. 12 is an example in which the user determines the arrangement of other users. However, as shown in FIGS. 13, 14A, and 14B, it is also possible to use azimuth information input screens in which the user selects a desired arrangement from a plurality of predetermined arrangements.

Figure 13:
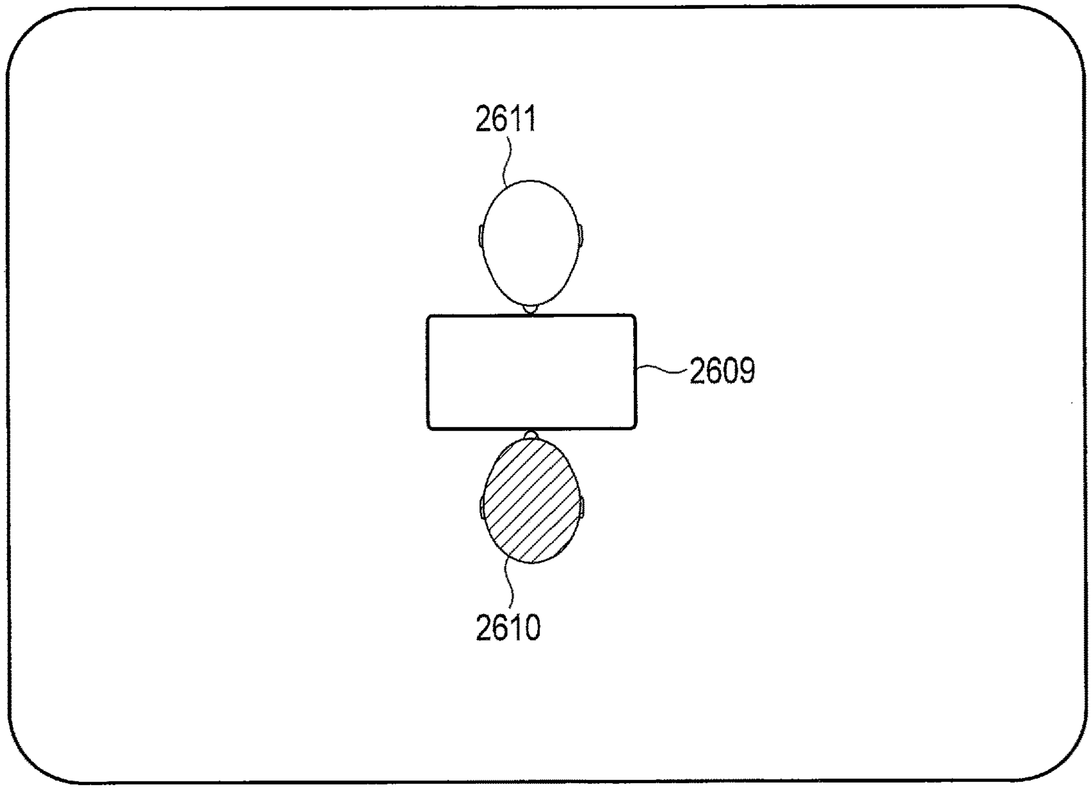
FIG. 13 is a view showing still another example of the azimuth information input screen.

FIG. 13 is an example in which the number of participants in an online meeting is two, and two users 2610 and 2611 face each other on the two sides of a schematic view 2609 of a meeting table. For example, the user 2610 is "myself". When this arrangement shown in FIG. 13 is selected, the processor 101 sets the azimuth of the user 2611 at "0".

Figure 14A:
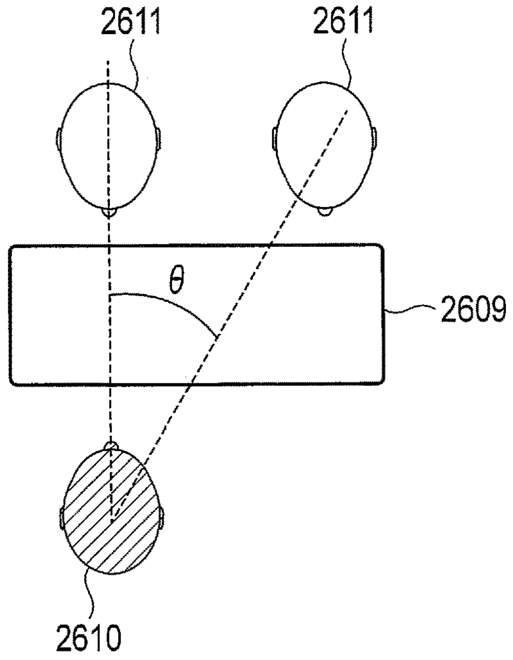
FIG. 14A is a view showing still another example of the azimuth information input screen.

FIG. 14A is an example in which the number of participants in an online meeting is three, and a user 2610 indicating "myself" and two other users 2611 face each other on the two sides of a schematic view 2609 of a meeting table. When this arrangement shown in FIG. 14A is selected, the processor 101 sets the azimuths of the two users 2611 at "0°" and "θ°".

Figure 14B:
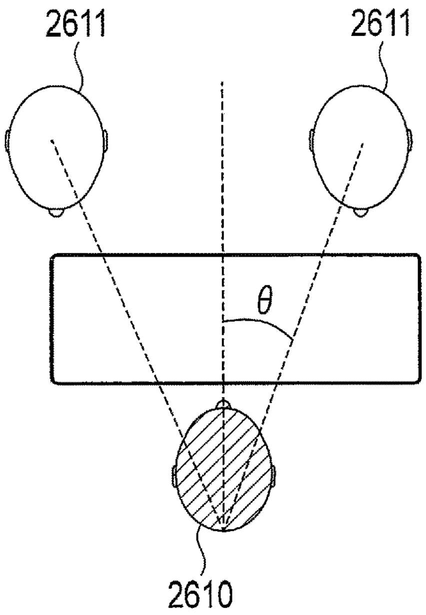
FIG. 14B is a view showing still another example of the azimuth information input screen.

FIG. 14B is an example in which two users 2611 are arranged at azimuths of ±θ° with respect to a user 2610 indicating "myself" on the two sides of a schematic view 2609 of a meeting table. When this arrangement shown in FIG. 14B is selected, the processor 101 sets the azimuths of the two users 2611 at "−θ°" and "θ°".

Note that the arrangement of users when the number of participants in an online meeting is two or three is not limited to those shown in FIGS. 13, 14A, and 14B. It is also possible to prepare an input screen similar to those shown in FIGS. 13, 14A, and 14B even when the number of participants in an online meeting is four or more.

Figure 15:
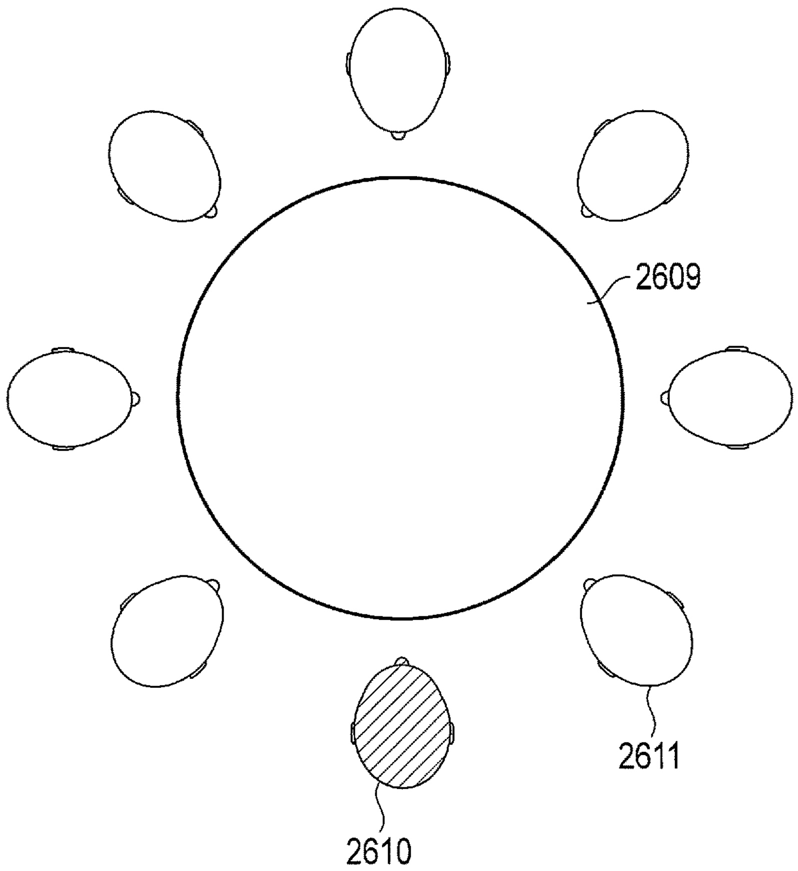
FIG. 15 is a view showing still another example of the azimuth information input screen.

Furthermore, the shape of the schematic view 2609 of a meeting table is not necessarily limited to a rectangle. For example, as shown in FIG. 15, a user 2610 indicating "myself" and other users 2611 can also be arranged around a schematic view 2609 of a round meeting table. FIG. 15 can also be an azimuth information input screen by which the user can arrange the markers 2604 in the same manner as in FIG. 12.

Figure 16:
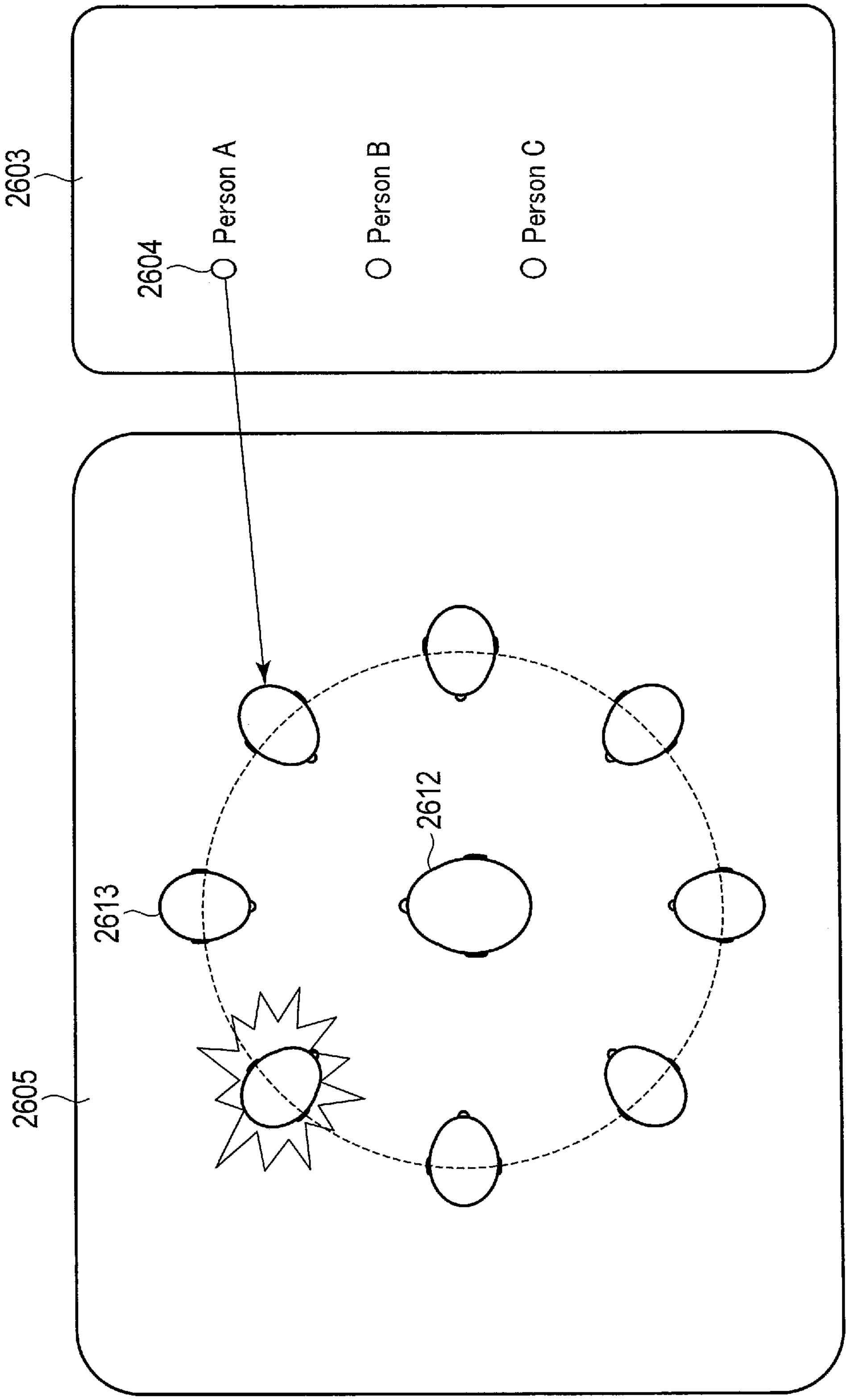
FIG. 16 is a view showing still another example of the azimuth information input screen.

It is not always necessary to use the schematic view of the meeting table shown in FIG. 12. For example, it is also possible to use an input screen as shown in FIG. 16 in which schematic views 2613 of users are arranged on the circumference around a user 2612 who hears voices, and azimuth information is input by arranging markers 2604 in the schematic views 2613 of the other users. The marker of a user who is speaking can emit light in this case as well.

Figure 17:
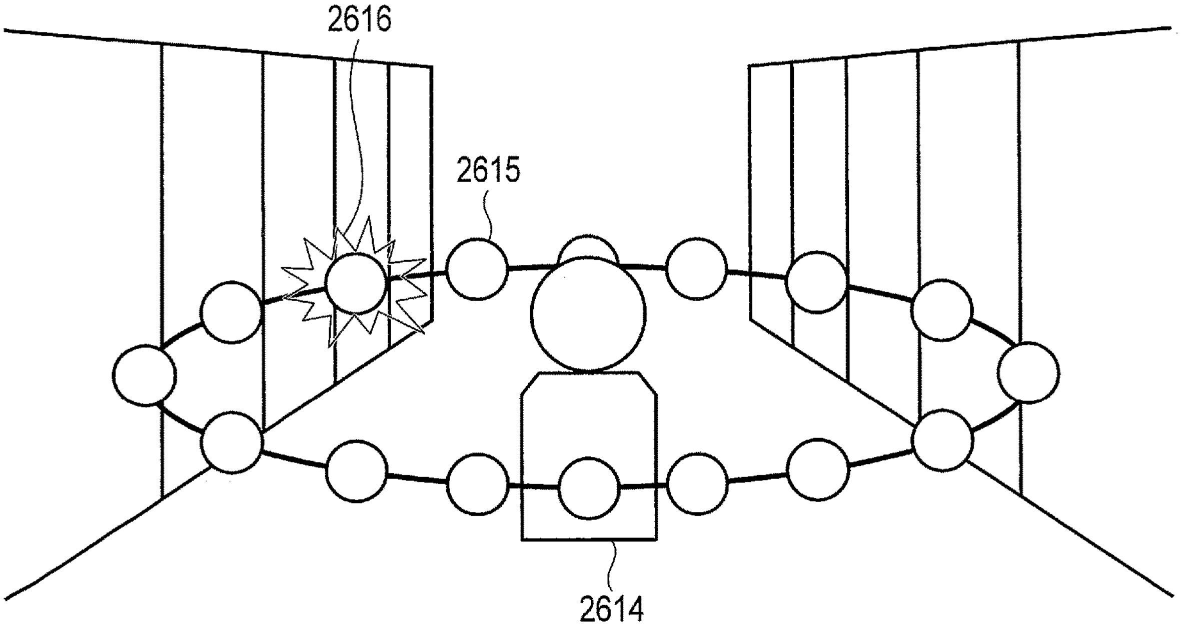
FIG. 17 is a view showing still another example of the azimuth information input screen.

Furthermore, the azimuth information can also be input on three-dimensional schematic views as shown in FIG. 17, instead of two-dimensional schematic views. For example, it is also possible to use an input screen in which schematic views 2615 of users are three-dimensionally arranged on the circumference of the head of a user 2614 who hears voices, and the azimuth information is input by arranging markers 2604 in the schematic views 2615 of the other users. The marker of a user who is speaking can emit light as indicated by reference numeral 2616 in this case as well. The front localization accuracy easily deteriorates especially when using headphones or earphones. This deterioration of the localization accuracy can be improved by visually guiding the user to the direction of a speaking user.

Modification 2 of Second Embodiment

Figure 18:
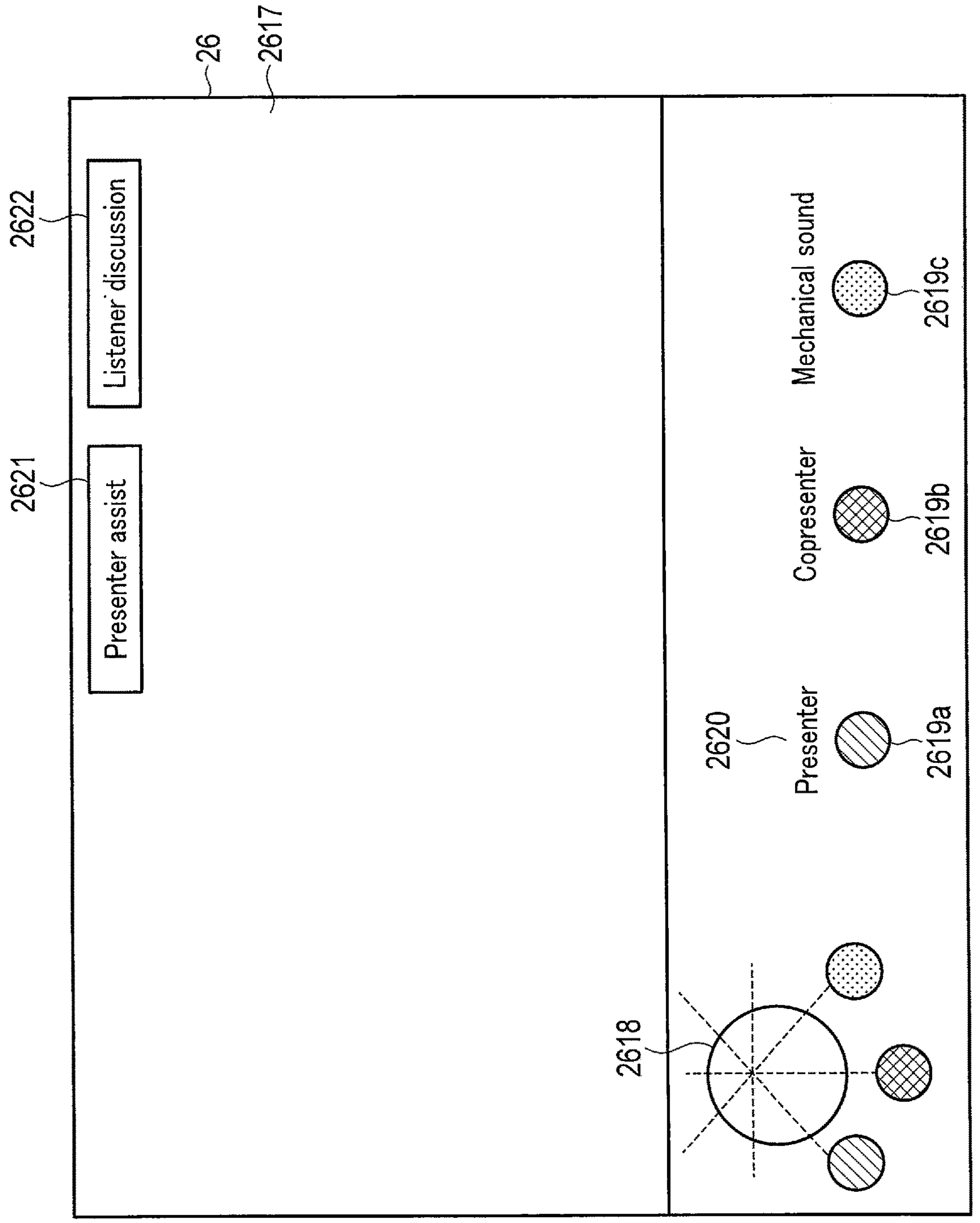
FIG. 18 is an example of a display screen to be displayed on each terminal in the case of an online lecture in Modification 2 of the second embodiment.

Modification 2 of the second embodiment will be explained below. Modification 2 of the second embodiment is an example suitable for an online lecture, and is a practical example using utilization information. FIG. 18 is an example of a display screen to be displayed on each terminal of an online lecture in Modification 2 of the second embodiment. In this example, the operation of the server Sv during the online lecture can be either the first example shown in FIG. 10 or the second example shown in FIG. 11.

As shown in FIG. 18, the display screen to be displayed during the online lecture in Modification 2 of the second embodiment includes a video image display region 2617. The video image display region 2617 is a region for displaying a video image distributed during the online lecture. The user can freely turn on or off the video image display region 2617.

As shown in FIG. 18, the display screen to be displayed during the online lecture in Modification 2 of the second embodiment further includes a schematic view 2618 indicating the localization directions of other users with respect to myself, and markers 2619*a*, 2619*b*, and 2619*c* representing the other users. As in Modification 1 of the second embodiment, the user arranges the markers 2619*a*, 2619*b*, and 2619*c* by dragging and dropping them on the schematic view 2618. In addition, attributes as utilization information are allocated to the markers 2619*a*, 2619*b*, and 2619*c* in Modification 2 of the second embodiment. For example, an attribute is the role of each user in the online lecture, and the host user HU can freely designate an attribute. When an attribute is allocated, a name 2620 of the attribute is displayed on the display screen. In FIG. 18, the attribute of the marker 2619*a* is "presenter", that of the marker 2619*b* is "copresenter", and that of the marker 2619*c* is "mechanical sound" such as the sound of a bell. That is, the user is not necessarily limited to a person in Modification 2 of the second embodiment. Also, various attributes such as "timekeeper" other than those shown in FIG. 18 can be designated.

For example, when the host user HU designates attributes, the processor 101 of the server Sv can adjust the reproduction of a sound image for each attribute. For example, when a voice signal of "presenter" and voice signals of other users are simultaneously input, the processor 101 can transmit only the voice of "presenter" to each terminal or localize a sound image so that the voice of "presenter" is clearly heard. The processor 101 can also transmit voices such as "mechanical sound" and "timekeeper" to only the terminal of "presenter" or localize sound images so that these voices cannot be heard on other terminals.

As shown in FIG. 18, the display screen to be displayed during the online lecture in Modification 2 of the second embodiment further includes a presenter assist button 2621 and a listener discussion button 2622. The presenter assist button 2621 is a button that is mainly selected by an assistant, such as a timekeeper, of a presenter. The presenter assist button 2621 can be set such that it is not displayed on terminals except the terminal of the assistant of the presenter. The listener discussion button 2622 is a button that is selected when performing discussion between listeners listening to the presentation by the presenter.

Figure 19:
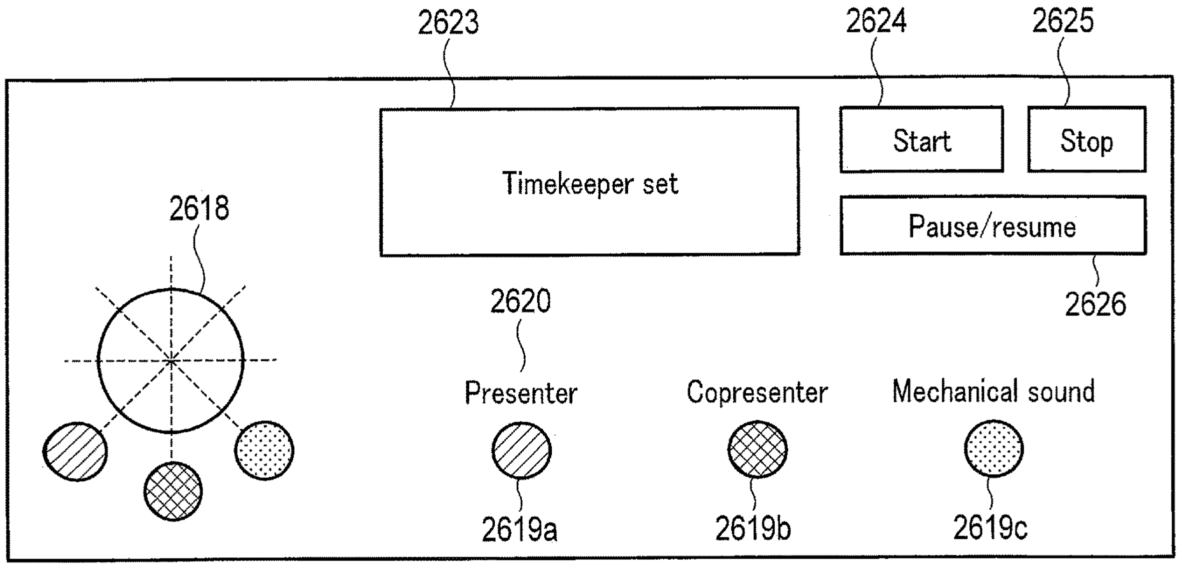
FIG. 19 is a view showing an example of a screen to be displayed on a terminal when a presenter assist button is selected.

FIG. 19 is a view showing an example of a screen to be displayed on a terminal when the presenter assist button 2621 is selected. When the presenter assist button 2621 is selected, as shown in FIG. 19, a timekeeper set button 2623, a start button 2624, a stop button 2625, and a pause/resume button 2626 are displayed.

The timekeeper set button 2623 is a button for performing various settings necessary for a timekeeper, such as the setting of the remaining time of the presentation, and the setting of the interval of the bell. The start button 2624 is a button that is selected when starting the presentation, and used to start timekeeping processes such as measuring the remaining time of the presentation and ringing the bell. The stop button 2625 is a button for stopping the timekeeping process. The pause/resume button 2626 is a button for switching pause/resume of the timekeeping process.

Figure 20:
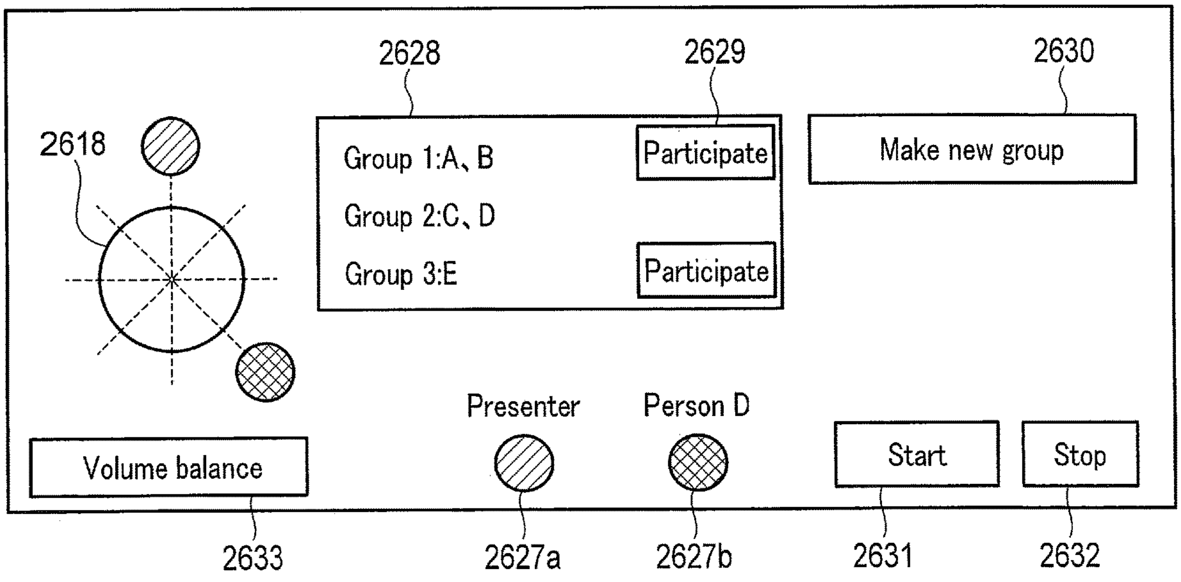
FIG. 20 is a view showing an example of a screen to be displayed on a terminal when a listener discussion button is selected.

FIG. 20 is a view showing an example of a screen to be displayed on a terminal when the listener discussion button 2622 is selected. When the listener discussion button 2622 is selected, the screen shown in FIG. 20 is displayed. This screen shown in FIG. 20 includes a schematic view 2618 indicating the localization directions of other users with respect to myself, and markers 2627*a* and 2627*b* representing the other users. As in Modification 1 of the second embodiment, the user arranges the markers 2627*a* and 2627*b* by dragging and dropping them on the schematic view 2618. In addition, attributes as utilization information are allocated to the markers 2627*a* and 2627*b*. Each user can freely designate an attribute when the listener discussion button 2622 is selected. When an attribute is allocated, the display screen displays a name representing the attribute. Referring to FIG. 20, the attribute of the marker 2627*a* is "presenter", and that of the marker 2627*b* is "person D".

As shown in FIG. 20, the display screen to be displayed when the listener discussion button 2622 is selected in Modification 2 of the second embodiment further includes a group setting field 2628. The group setting field 2628 is a display field for setting groups of listeners. The group setting field 2628 displays a list of currently set groups. This group list includes the name of a group, and the names of users belonging to the group. The name of a group can be determined by a user having initially set the group, and can also be predetermined. In the group setting field 2628, a participation button 2629 is displayed near the name of each group. When the participation button 2629 is selected, the processor 101 attaches the user to the corresponding group.

The display screen to be displayed when the listener discussion button 2622 is selected further includes a make new group button 2630. The make new group button 2630 is selected when setting a new group not displayed in the group setting field 2628. When the make new group button 2630 is selected, the user sets, e.g., the name of the group. When making a new group, it is also possible to designate a user who is unwanted to participate in the group. For this user who is set to be unwanted to participate in the group, the processor 101 performs control so as not to display the participation button 2629 on the display screen. In FIG. 20, participation in "group 2" is inhibited.

The display screen to be displayed when the listener discussion button 2622 is selected also includes a start button 2631 and a stop button 2632. The start button 2631 is a button for starting a listener discussion. The stop button 2632 is a button for stopping the listener discussion.

The display screen to be displayed when the listener discussion button 2622 is selected further includes a volume balance button 2633. The volume balance button 2633 is a button for designating the volume balance between the user as "presenter" and other users belonging to groups.

For example, when a group is set and the start button 2631 is selected, the processor 101 localizes sound images so that only users belonging to the group can hear voices. Also, the processor 101 adjusts the volume of the user as "presenter" and the volume of other users in accordance with the designation of the volume balance.

The group setting field 2628 can also be configured such that a user having initially set a group can switch active/inactive of the group. In this case, an active group and an inactive group can be displayed in different colors in the group setting field 2628.

Third Embodiment

Figure 21:
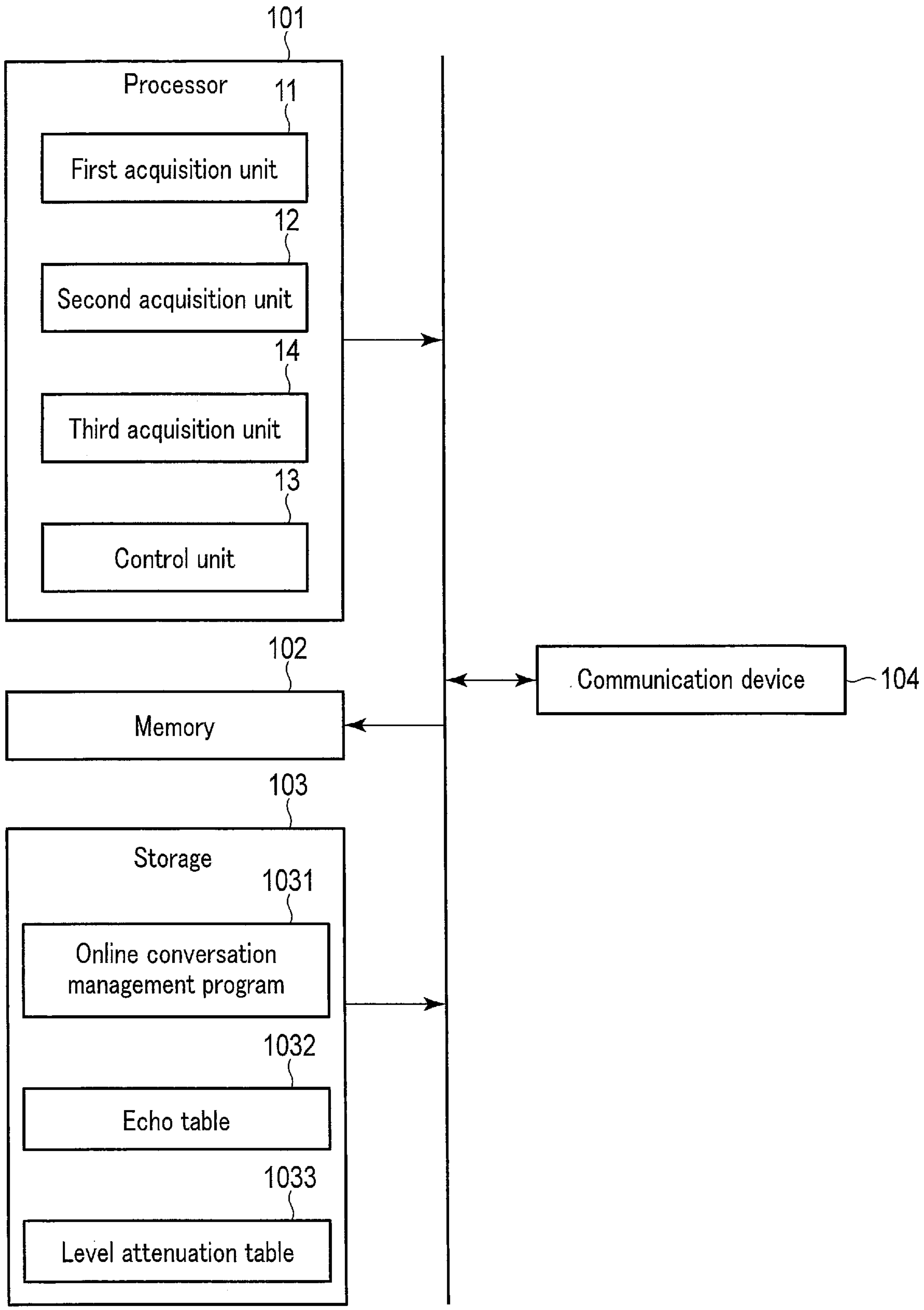
FIG. 21 is a view showing the configuration of an example of a server according to the third embodiment.

The third embodiment will be explained below. FIG. 21 is a view showing the configuration of an example of a server Sv according to the third embodiment. In FIG. 21, an explanation of the same components as those shown in FIG. 9 will be omitted. The difference of the third embodiment is that an echo table 1032 is stored in a storage 103. The echo table 1032 is a table of echo information for adding a predetermined echo effect to a sound image signal. The echo table 1032 has echo data measured in advance in a small meeting room, a large meeting room, and a hemi-anechoic room, as table data. A processor 101 of the server Sv acquires, from the echo table 1032, echo data corresponding to a virtual environment in which a sound image is supposed to be used, as utilization information designated by the user, adds an echo based on the acquired echo data to a sound image signal, and transmits the sound image signal to each terminal.

FIGS. 22A, 22B, 22C, and 22D are examples of a screen for inputting the utilization information related to the echo data. In the screens shown in FIGS. 22A to 22D, the user designates a virtual environment in which a sound image is supposed to be used.

Figure 22A:
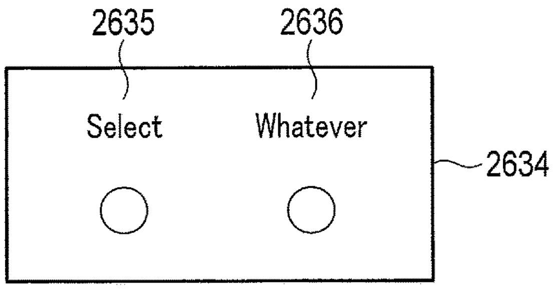
FIG. 22A is an example of a screen for inputting utilization information on echo data.

FIG. 22A shows a screen 2634 to be initially displayed. The screen 2634 shown in FIG. 22A includes a "select" field 2635 for the user to select an echo and a "whatever" field 2636 for the server Sv to select an echo. For example, a host user HU select a desired one of the "select" field 2635 and the "whatever" field 2636. If the "whatever" field 2636 is selected, the server Sv automatically selects an echo. For example, the server Sv selects one of echo data measured in a small meeting room, echo data measured in a large meeting room, and echo data measured in a hemi-anechoic room, in accordance with number of participants in an online meeting.

Figure 22B:
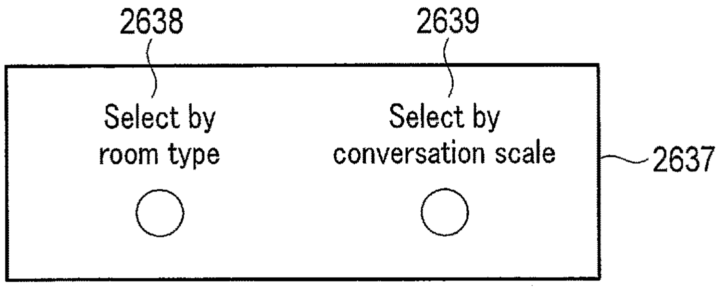
FIG. 22B is an example of a screen for inputting utilization information on echo data.

FIG. 22B shows a screen 2637 to be displayed when the "select" field 2636 is selected. The screen 2637 shown in FIG. 22B includes a "select by room type" field 2638 for selecting an echo corresponding to the type of room, and a "select by conversation scale" field 2639 for selecting an echo corresponding to a conversation scale. For example, the host user HU selects a desired one of the "select by room type" field 2638 and the "select by conversation scale" field 2639.

Figure 22C:
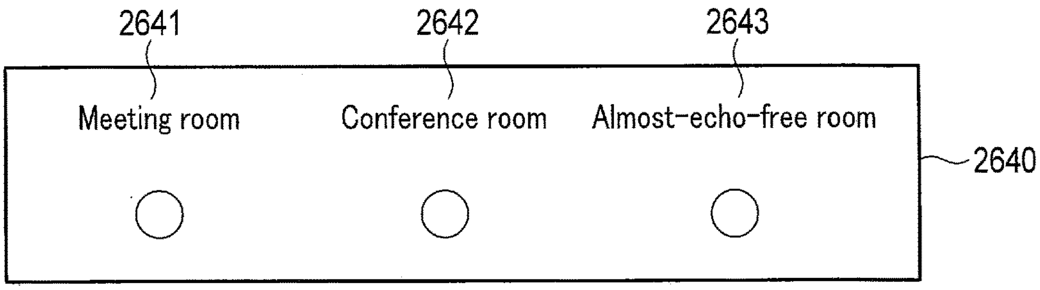
FIG. 22C is an example of a screen for inputting utilization information on echo data.

FIG. 22C shows a screen 2640 to be displayed when the "select by room type" field 2638 is selected. The screen 2640 shown in FIG. 22C includes a "meeting room" field 2641 for selecting an echo corresponding to a "meeting room", i.e., a small meeting room, a "conference room" field 2642 for selecting an echo corresponding to a "conference room", i.e., a large meeting room, and an "almost-echo-free room" field 2643 for selecting an echo corresponding to an almost-echo-free room, i.e., an anechoic room. For example, the host user HU selects a desired one of the "meeting room" field 2641, the "conference room" field 2642, and the "almost-echo-free room" field 2643.

If the "meeting room" field 2641 is selected by the user, the processor 101 of the server Sv acquires echo data measured in advance in a small meeting room from the echo table 1032. If the "conference room" field 2642 is selected by the user, the processor 101 acquires echo data measured in advance in a large meeting room from the echo table 1032. If the "almost-echo-free room" 2643 is selected by the user, the processor 101 acquires echo data measured in advance in an anechoic room from the echo table 1032.

Figure 22D:
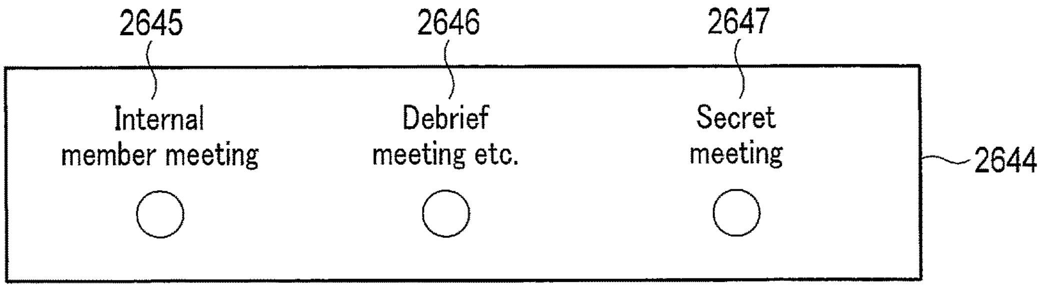
FIG. 22D is an example of a screen for inputting utilization information on echo data.

FIG. 22D shows a screen 2644 to be displayed when the "select by conversation scale" 2639 is selected. The screen 2644 shown in FIG. 22D includes an "internal member meeting" field 2645 for selecting an echo corresponding to a medium conversation scale, a "debrief meeting etc." field 2646 for selecting an echo corresponding to a relatively large conversation scale, and a "secret meeting" field 2647 for selecting an echo corresponding to a small conversation scale. For example, the host user HU selects a desired one of the "internal member meeting" field 2645, the "debrief meeting etc." field 2646, and the "secret meeting" field 2647.

If the "internal member meeting" field 2645 is selected by the user, the processor 101 of the server Vs acquires echo data measured in advance in a small meeting room from the echo table 1032. If the "debrief meeting etc." field 2646 is selected by the user, the processor 101 acquires echo data measured in advance in a large meeting room from the echo table 1032. If the "secret meeting" field 2647 is selected by the user, the processor 101 acquires echo data measured in advance in an anechoic room from the echo table 1032.

In the third embodiment as explained above, the server Sv holds echo information corresponding to the size of room, the purpose of use, and the atmosphere of meeting, in the form of a table. The server Sv adds an echo selected from the table to a voice signal for each user. This can reduce the feeling of fatigue when the voices of individual users are heard by the same volume level.

In the third embodiment, the echo table contains three types of echo data. However, the echo table can also contain one or two types of echo data or four or more types of echo data.

Modification of Third Embodiment

In the third embodiment, the storage 103 can further store a level attenuation table 1033. The level attenuation table 1033 has level attenuation data corresponding to the distance of a sound volume measured in advance in an anechoic room, as table data. In this case, the processor 101 of the server Sv acquires level attenuation data corresponding to a virtual distance between the user and a virtual sound source in which a sound image is supposed to be used, and adds level attenuation corresponding to the acquired level attenuation data to a sound image signal. This can also reduce the feeling of fatigue when the voices of individual users are heard by the same volume level.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An online conversation management apparatus comprising a processor configured to:

acquire, across a network, reproduction environment information from a plurality of terminals, one of which is set as a host terminal, that reproduce a sound image via a reproduction device, the reproduction environment information being information of a sound reproduction environment of the reproduction device;

acquire azimuth information, being information of a localization direction of the sound image with respect to a user of the terminals; and perform control for reproducing a sound image of each terminal based on the reproduction environment information and the azimuth information, wherein acquire the reproduction environment information of individual terminals from the individual terminals, collectively acquire the azimuth information of individual terminals from the host terminal, cause each terminal to display a first input screen for inputting the reproduction environment information, and acquire, from each terminal, the reproduction environment information of the terminal in accordance with input on the first input screen, and cause the host terminal to display a second input screen for inputting the azimuth information of each terminal, and acquires the azimuth information of the terminal from the host terminal in accordance with input on the second input screen.

2. The apparatus according to claim 1, wherein the processor receives, from the terminals, a sound image signal in which a sound image filter coefficient based on the reproduction environment information and the azimuth information is convoluted in the terminals, separates the received sound image signal into sound image signals for individual terminals, superposes sound image signals for the same terminal, and transmits the superposed sound image signal to a corresponding terminal.

3. The apparatus according to claim 1, wherein the processor determines a sound image filter coefficient for reproducing the sound image of each terminal based on the reproduction environment information and the azimuth information, generates, from a voice signal transmitted from the terminals, a sound image signal of each terminal based on the determined sound image filter coefficient of each terminal, and transmits the generated sound image signal of each terminal to a corresponding terminal.

4. The apparatus according to claim 1, wherein the first input screen includes a list of the reproduction devices.

5. The apparatus according to claim 1, wherein the second input screen includes an input field for inputting an azimuth for localizing a voice uttered from each user as the sound image.

6. The apparatus according to claim 1, wherein the second input screen includes an input screen for inputting an azimuth for localizing a voice uttered from each user as the sound image, by arranging markers on chairs in a schematic view of a meeting room.

7. The apparatus according to claim 6, wherein the second input screen is configured to arrange the markers on the chairs by dragging the markers.

8. The apparatus according to claim 1, wherein the second input screen includes an input screen for inputting an azimuth for localizing a voice uttered from each user as the sound image, by designating positions of other users on a circumference around a position of a user of the terminal.

9. The apparatus according to claim 1, wherein the processor acquires utilization information as information on utilization of the sound image of a user of a terminal, and performs control for reproducing a sound image of each terminal based on the utilization information.

10. The apparatus according to claim 9, wherein the processor causes each terminal to display a third input screen for inputting the utilization information, and acquires, from the terminal, the utilization information of the terminal in accordance with input on the third input screen.

11. The apparatus according to claim 10, wherein the utilization information contains information of an attribute to be allocated to each user, and the processor performs control for reproducing a sound image of each terminal in accordance with the attribute information.

12. The apparatus according to claim 10, wherein the utilization information contains setting of a group of users of the terminals, and the processor performs control for reproducing a sound image of each terminal in accordance with the setting of the group.

13. The apparatus according to claim 10, wherein the third input screen includes a first input section for accepting setting of reproduction of the sound image based on the utilization information, a second input section for accepting designation of start of reproduction of the sound image based on the utilization information, a third input section for accepting designation of pause or resume of reproduction of the sound image based on the utilization information, and a fourth input section for accepting designation of stop of reproduction of the sound image based on the utilization information.

14. The apparatus according to claim 9, wherein the utilization information contains information of a virtual environment in which the sound image is supposed to be used, and the processor adds an echo corresponding to the virtual environment information to a sound image of each terminal.

15. The apparatus according to claim 14, wherein the processor adds the echo to a sound image of each terminal based on table data of an echo measured in advance in an actual environment corresponding to the virtual environment.

16. The apparatus according to claim 9, wherein the utilization information contains information of a distance between a virtual sound source that reproduces the sound image and a user of the terminal, and the processor adds level attenuation corresponding to the distance to a sound image of each terminal.

17. The apparatus according to claim 16, wherein the processor adds the level attenuation to a sound image of each terminal based on table data of level attenuation measured in advance in an anechoic room.

18. An online conversation management apparatus comprising a processor configured to:

acquire, across a network, reproduction environment information from a plurality of terminals that reproduce a sound image via a reproduction device, the reproduction environment information being information of a sound reproduction environment of the reproduction device;

acquire azimuth information, being information of a localization direction of the sound image with respect to a user of the terminals; and perform control for reproducing a sound image of each terminal based on the reproduction environment information and the azimuth information;

acquire the reproduction environment information of individual terminals from the individual terminals, acquire the azimuth information of individual terminals from the individual terminals, cause each terminal to display a first input screen for inputting the reproduction environment information, and acquires, from the terminals, the reproduction environment information of the terminals in accordance with input on the first input screen, and cause each terminal to display a second input screen for inputting the azimuth information of the terminal, and acquires, from the terminals, the azimuth information of the terminal in accordance with input on the second input screen.

19. A computer-readable non-transitory storage medium storing an online conversation management program for causing a computer to execute:

acquiring, across a network, reproduction environment information from at least one a plurality of terminals, one of which is set as a host terminal, that reproduce a sound image via a reproduction device, the reproduction environment information being information of a sound reproduction environment of the reproduction device;

acquiring azimuth information, the azimuth information being information of a localization direction of the sound image with respect to a user of the terminals; and performing control for reproducing a sound image of each terminal based on the reproduction environment information and the azimuth information; further including, acquiring the reproduction environment information of individual terminals from the individual terminals, collectively acquiring the azimuth information of individual terminals from the host terminal, causing each terminal to display a first input screen for inputting the reproduction environment information, and acquire, from the terminal, the reproduction environment information of the terminal in accordance with input on the first input screen, and causing the host terminal to display a second input screen for inputting the azimuth information of each terminal, and in acquiring the azimuth information of the terminals from the host terminal in accordance with input on the second input screen.

* * * * *